(12) United States Patent
Watanabe

(10) Patent No.: US 12,015,759 B2
(45) Date of Patent: Jun. 18, 2024

(54) INFORMATION PROCESSING SYSTEM, INFORMATION PROCESSING METHOD, AND INFORMATION PROCESSING PROGRAM

(71) Applicant: GREE, INC., Tokyo (JP)

(72) Inventor: Masashi Watanabe, Tokyo (JP)

(73) Assignee: GREE, INC., Tokyo (JP)

( * ) Notice: Subject to any disclaimer, the term of this patent is extended or adjusted under 35 U.S.C. 154(b) by 227 days.

(21) Appl. No.: 17/851,789

(22) Filed: Jun. 28, 2022

(65) Prior Publication Data

US 2022/0417490 A1 Dec. 29, 2022

(30) Foreign Application Priority Data

Jun. 28, 2021 (JP) .................................. 2021-106384

(51) Int. Cl.
*H04N 13/279* (2018.01)
*H04N 13/194* (2018.01)
*H04N 13/282* (2018.01)

(52) U.S. Cl.
CPC ......... *H04N 13/279* (2018.05); *H04N 13/194* (2018.05); *H04N 13/282* (2018.05)

(58) Field of Classification Search
CPC .. H04N 13/279; H04N 13/194; H04N 13/282; A63F 13/35; A63F 13/5252; A63F 13/5258; A63F 13/87; G06F 16/444
USPC ......................................................... 348/46
See application file for complete search history.

(56) References Cited

U.S. PATENT DOCUMENTS

| | | | |
|---|---|---|---|
| 2006/0040740 A1 | 2/2006 | DiDato | |
| 2017/0001112 A1* | 1/2017 | Gilmore | .................. A63F 13/85 |
| 2017/0001122 A1* | 1/2017 | Leung | .................... A63F 13/355 |
| 2017/0003784 A1* | 1/2017 | Garg | ........................ A63F 13/87 |
| 2018/0321817 A1* | 11/2018 | Terahata | ............... A63F 13/211 |

FOREIGN PATENT DOCUMENTS

| | | |
|---|---|---|
| CN | 111957042 A | 11/2020 |
| JP | 2020-179184 A | 11/2020 |

OTHER PUBLICATIONS

Feb. 21, 2023 Office Action issued in Japanese Patent Application No. 2021-106384.
Kenno Ichigaya, "Fade to Black: A new category of 3D action game incorporating the latest technology", DOS/V Power Report, Impress Co., Ltd., vol. 5, No. 6 (Dec. 1, 1995).

* cited by examiner

*Primary Examiner* — Tung T Vo
(74) *Attorney, Agent, or Firm* — Oliff PLC

(57) ABSTRACT

An information processing system includes a drawing portion that draws a display image for a terminal including one or more display media positioned in a virtual space; an acquisition portion that acquires input from a user; a state switching portion that switches, between a plurality of states, a state of the display medium; a position changing portion that changes the position of the display medium associated with one user in the virtual space, based on a first input from the one user acquired by the acquisition portion when the state of the display medium is a first state; and a viewpoint switching portion that switches a viewpoint of when the drawing portion draws the display image from a first viewpoint to a second viewpoint when the state of the display medium is switched from the first state to a second state by the state switching portion.

21 Claims, 17 Drawing Sheets

| USER ID | USER NAME | USER AUTHENTIFICATION INFORMATION | USER AVATAR ID | POSITION/ ORIENTATION INFORMATION | FRIEND INFORMATION | SPECIFIC OBJECT ID | ... |
|---|---|---|---|---|---|---|---|
| U01 | USER A | *** | *** | *** | *** | ***, ***, ***, ... | ... |
| U02 | USER B | *** | *** | *** | *** | ***, ***, ***, ... | ... |
| ... | ... | ... | ... | ... | ... | ... | ... |

FIG. 6

| USER AVATAR ID | FACE PART ID | HAIRSTYLE PART ID | CLOTHING PART ID | STATE INFORMATION | SEATING PARAMETER | ... |
|---|---|---|---|---|---|---|
| A01 | *** | *** | *** | SEATED | *** | ... |
| A02 | *** | *** | *** | MOVEMENT-ENABLED (NON-SEATED) | *** | ... |
| ... | ... | ... | ... | SEATED | *** | ... |

FIG. 7

| GROUP ID | GROUP NAME | USER ID |
|---|---|---|
| * * * | * * * | * * * <br> * * * <br> * * * <br> . . . |
| * * * | * * * | * * * |
| . . . | . . . | . . . |

INFORMATION PROCESSING SYSTEM, INFORMATION PROCESSING METHOD, AND INFORMATION PROCESSING PROGRAM

This application claims the benefit of priority from Japanese Patent Application No. 2021-106384 filed Jun. 28, 2021, the entire contents of the prior application being incorporated herein by reference.

TECHNICAL FIELD

This disclosure relates to an information processing system, an information processing method, and an information processing program.

BACKGROUND TECHNOLOGY

There is a known technology that places an avatar and a virtual camera in a virtual space and generates a terminal image according to a setting of the virtual camera. In this case, a viewing coordinate system of the virtual camera is linked to a viewing coordinate system of a head-mounted display worn by a user.

SUMMARY

Problem to be Resolved

In the above conventional technology, a viewpoint of the virtual camera is fixed in a state of being linked to a viewpoint of the avatar (an example of a display medium) in the virtual space, making it difficult to generate a terminal image in a manner that can effectively support various activities of the user via the avatar in the virtual space according to attributes of each activity. For example, it is difficult to effectively support a movement operation input of the avatar in the virtual space, and to effectively support dialog and the like between users in the virtual space via the avatar.

Therefore, in one aspect, an objective of this disclosure is to generate a terminal image that effectively supports various activities of users via a display medium in a virtual space.

Means of Solving Problem

An information processing system is disclosed, including:
a drawing portion that draws a display image for a terminal including one or more display media positioned in a virtual space;
an acquisition portion that acquires input from a user;
a state switching portion that switches, between a plurality of states, a state of the display medium associated with one user, the plurality of states including (i) a first state in which the position of the display medium can be changed from a current position, and (ii) a second state in which the position of the display medium cannot be changed from the current position;
a position changing portion that changes the position of the display medium associated with one user in the virtual space, based on a first input from the one user acquired by the acquisition portion when the state of the display medium is the first state; and
a viewpoint switching portion that switches a viewpoint of when the drawing portion draws the display image associated with the one user from a first viewpoint to a second viewpoint when the state of the display medium associated with the one user is switched from the first state to the second state by the state switching portion.

Effect

In one aspect, this disclosure makes it possible to generate a terminal image that effectively supports various activities of a user via a display medium in a virtual space.

BRIEF EXPLANATION OF DRAWINGS

FIG. 6 is an explanatory view of data in a user database.

FIG. 7 is an explanatory view of data in an avatar database.

MODE TO IMPLEMENT DISCLOSURE (Overview of Virtual Reality Generation System)

Figure 1:
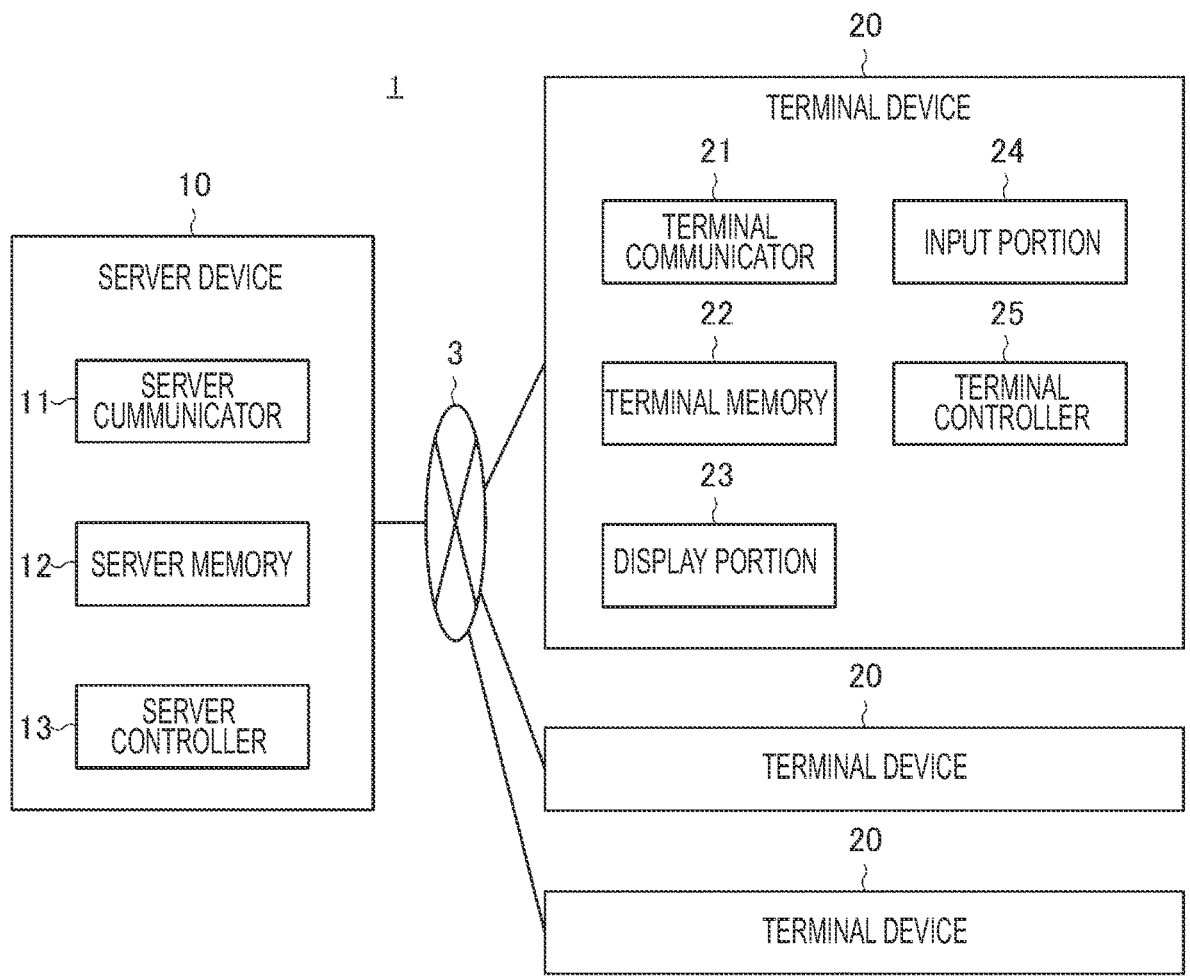
FIG. 1 is a block diagram of a virtual reality generation system according to this embodiment.

With reference to FIG. 1, an overview of a virtual reality generation system 1 according to an embodiment of this disclosure is explained. FIG. 1 is a block diagram of the virtual reality generation system 1 according to this embodiment. The virtual reality generation system 1 is provided with a server device 10 and one or more terminal devices 20. For simplicity, three terminal devices 20 are illustrated in FIG. 1, but the number of terminal devices 20 can be two or more.

The server device 10 is, for example, a server or the like managed by an administrator providing one or more virtual realities. The terminal devices 20 are devices used by a user, for example, a cell phone, a smartphone, a tablet terminal, a PC (personal computer), a head-mounted display, a game device, or the like. A plurality of terminal devices 20 can be connected to the server device 10 via a network 3, typically in a manner different for each user.

The terminal devices 20 can execute a virtual reality application according to this embodiment. The virtual reality application may be received by the terminal devices 20 from the server device 10, or a predetermined application distribution server, via the network 3. Alternatively, it may be stored in advance in a memory device provided in the terminal devices 20 or a memory medium such as a memory card that can be read by the terminal devices 20. The server device 10 and the terminal devices 20 are communicatively connected via the network 3. For example, the server device 10 and the terminal devices 20 cooperate to perform various processes related to virtual reality.

Additionally, the network 3 may be a wireless communication network, the Internet, a VPN (Virtual Private Network), a WAN (Wide Area Network), a wired network, or any combination thereof.

The following is an overview of the virtual reality according to this embodiment. The virtual reality according to this embodiment is, for example, a virtual reality for any reality such as education, travel, role-playing, simulation, entertainment such as games and concerts, or the like. A virtual reality medium such as an avatar is used in the execution of virtual reality. For example, the virtual reality according to this embodiment is realized by a three-dimensional virtual space, various virtual reality media that appear in the virtual space, and various contents provided in the virtual space.

A virtual reality medium is electronic data used in the virtual reality, and includes any medium such as cards, items, points, in-service currency (or in-virtual reality currency), tokens (for example, Non Fungible Token (NFT)), tickets, characters, avatars, parameters, and the like. The virtual reality medium may also be virtual reality-related information, such as level information, status information, virtual reality parameter information (physical fitness values, attack power, or the like) or ability information (skills, abilities, spells, jobs, or the like). The virtual reality medium is also electronic data that can be acquired, owned, used, managed, exchanged, combined, reinforced, sold, disposed of, gifted, or the like within the virtual reality by the user, but usage modes of the virtual reality medium are not limited to those specified herein.

(Configuration of Server Device)

The configuration of the server device 10 will be described in detail. The server device 10 is constituted by a server computer. The server device 10 may be realized by a plurality of server computers working together. For example, the server device 10 may be realized by a server computer that provides various contents, a server computer that realizes various authentication servers, and the like. The server device 10 may also include a web server. In this case, some of the functions of the terminal devices 20 described below may be realized by a browser processing HTML documents received from the web server and various programs (Javascript) associated with them.

The server device 10 is provided with a server communicator 11, a server memory 12, and a server controller 13.

The server communicator 11 includes an interface that communicates with an external device by wireless or by wire to transmit and receive information. The server communicator 11 may include, for example, a wireless LAN (Local Area Network) communication module, a wired LAN communication module, or the like. The server communicator 11 can send and receive information to and from the terminal devices 20 via the network 3.

The server memory 12 is, for example, a memory device, and stores various information and programs necessary for various processes related to virtual reality. For example, the server memory 12 stores virtual reality applications.

Furthermore, the server memory 12 also stores data for drawing virtual spaces, for example, images of indoor spaces such as buildings, outdoor spaces, or the like. The data for drawing virtual spaces may be prepared in a plurality of types, and may be used differently, for each virtual space.

The server memory 12 also stores various images (texture images) for projection (texture mapping) onto various objects placed in the three-dimensional virtual space.

For example, the server memory 12 stores drawing information of a user avatar M1 (an example of a display medium) as a virtual reality medium to be associated with each user. Additionally, the users are users of the virtual reality generation system 1. In addition to general users, users may include staff users who operate avatars in association with the administrator of the virtual reality generation system 1, guest users who provide content in the virtual space, and the like. The user avatar M1 is drawn in the virtual space based on drawing information of the user avatar M1.

The server memory 12 also stores drawing information pertaining to various objects that are different from the user avatar M1, for example, buildings, walls, trees, NPCs (Non-Player Characters), and the like. The various objects in the virtual space are drawn based on such drawing information.

Hereinafter, objects corresponding to any virtual reality medium (for example, buildings, walls, trees, NPCs, and the like) different from the user avatar M1 and drawn in the virtual space are referred to as second objects M3. Furthermore, in this embodiment, the second objects M3 may include objects that are fixed in the virtual space, objects that are movement-enabled in the virtual space, and the like. The second objects M3 may also include objects that are constantly placed in the virtual space, objects that are placed only when predetermined placement conditions are met, and the like.

The server controller 13 may include a dedicated microprocessor, a CPU (Central Processing Unit) that achieves specific functions by loading a specific program, a GPU (Graphics Processing Unit), and the like. For example, the server controller 13 cooperates with the terminal devices 20 to execute a virtual reality application in response to user operations on respective display portions 23 of the terminal devices 20. The server controller 13 also executes various processes related to virtual reality. Details of the specific processing of the server controller 13 are described below.

(Configuration of Terminal Device)

The configuration of the terminal devices 20 will be explained. As shown in FIG. 1, the terminal devices 20 are provided with a terminal communicator 21, a terminal memory 22, a display portion 23, an input portion 24, and a terminal controller 25.

The terminal communicator 21 includes an interface that communicates with an external device by wireless or by wire, and transmits and receives information. The terminal communicator 21 may include wireless communication modules, wireless LAN communication modules, wired LAN communication modules, and the like that support mobile communication standards such as LTE (Long Term Evolution) (registered trademark), LTE-A (LTE-Advanced), 5th generation mobile communication systems, UMB (Ultra Mobile Broadband), and the like. The terminal communicator 21 can transmit and receive information to and from the server device 10 via the network 3.

The terminal memory 22 includes, for example, a primary memory device and a secondary memory device. For example, the terminal memory 22 may include semiconductor memory, magnetic memory, optical memory, or the like. The terminal memory 22 stores various information and programs used in the processing of virtual reality that are received from the server device 10. The information and programs used in the processing of virtual reality may be obtained from an external device via the terminal communicator 21. For example, a virtual reality application program may be obtained from a predetermined application distribution server. Hereinafter, application programs are also referred to simply as applications. Additionally, for example, some or all of the above-mentioned information regarding the user and information regarding other users' virtual reality media may be obtained from the server device 10.

The display portion 23 includes a display device, for example, a liquid crystal display, an organic EL (Electro-Luminescence) display, or the like. The display portion 23 can display a variety of images. The display portion 23 is constituted by, for example, a touch panel, and functions as an interface that detects various user operations. Additionally, the display portion 23 may be in a form of a head-mounted display.

The input portion 24 includes an input interface including, for example, a touch panel integrally provided with the display portion 23. The input portion 24 can accept user input to the terminal device 20. Furthermore, the input portion 24 may include physical keys or may further include any input interface, including a pointing device such as a mouse or the like. The input portion 24 may also be able to accept non-contact user input, such as voice input and gesture input. Additionally, for gesture input, a sensor (an image sensor, an acceleration sensor, a distance sensor, or the like) may be used to detect body movements of a user. In this case, the input portion 24 may be realized by an acceleration sensor, a gyro sensor, or the like built into the terminal device 20.

The terminal controller 25 includes one or more processors. The terminal controller 25 controls an overall operation of the terminal device 20.

The terminal controller 25 transmits and receives information via the terminal communicator 21. For example, the terminal controller 25 receives various information and programs used for various processes related to virtual reality from at least one of the server device 10 and other external server(s). The terminal controller 25 stores the received information and programs in the terminal memory 22. For example, the terminal memory 22 may contain a browser (Internet browser) for connecting to a web server.

The terminal controller 25 starts a virtual reality application in response to a user operation. The terminal controller 25 cooperates with the server device 10 to execute various processes related to virtual reality. For example, the terminal controller 25 displays an image of the virtual space on the display portion 23. On the screen, for example, a GUI (Graphical User Interface) may be displayed that detects user operations. The terminal controller 25 can detect user operations on the screen via the input portion 24. For example, the terminal controller 25 can detect a tap operation, a long tap operation, a flick operation, a swipe operation, and the like by the user. The tap operation is one in which the user touches the display portion 23 with a finger and then releases the finger. The terminal controller 25 transmits the operation information to the server device 10.

(Example of Virtual Space)

The server controller 13, in cooperation with the terminal devices 20, displays images of the virtual space on the display portion 23, and updates the images of the virtual space according to the progress of the virtual reality and the user operations. In this embodiment, the server controller 13 cooperates with the terminal devices 20 to draw objects in the three-dimensional virtual space as seen from a virtual camera placed in the virtual space.

Although the drawing process described below is realized by the server controller 13, in other embodiments, part or all of the drawing process described below may be realized by the server controller 13. In the following explanation, at least part of the image of the virtual space displayed on the terminal device 20 may be a web display that is displayed on the terminal device(s) 20 based on data generated by the server device 10, or at least part of the image may be a native display that is displayed by a native application installed on the terminal device(s) 20.

Figure 2:
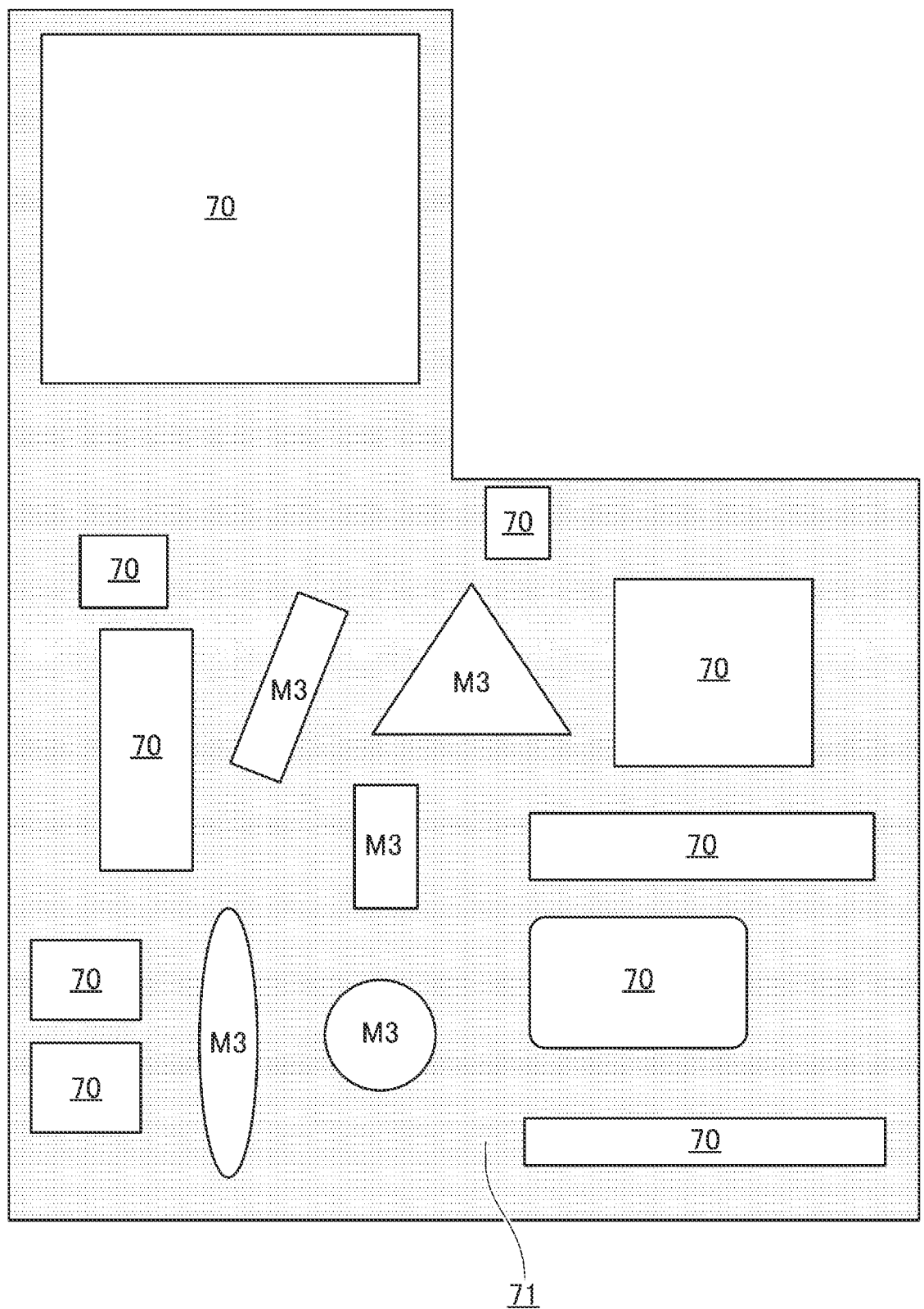
FIG. 2 is an explanatory view of an example of a virtual space that can be generated by the virtual reality generation system.

FIG. 2 is an explanatory view of an example of a virtual space that can be generated by a virtual reality generation system 1.

In this embodiment, the virtual space may include a plurality of space portions. Each of the plurality of space portions is a space portion into which the user avatar M1 may enter, and each may be able to provide its own content. Each of the plurality of space portions may be generated in a manner that they form contiguous spaces within the virtual space, similar to the various spaces in reality. Alternatively, part or all of the plurality of space portions may be discontinuous with each other. A discontinuity is a relationship that is connected in a manner that violates the laws of physics in reality, for example, a relationship between spatial parts that can be moved in a manner of instantaneous movement, such as a warp.

In the example shown in FIG. 2, the virtual space is provided with a free space portion 71 and a plurality of content-providing space portions 70. In the free space portion 71, the user avatar M1 can basically move freely. Additionally, in the free space portion 71 as well, contents (for example, various contents described below, such as those provided in the space portions 70) may also be provided as appropriate.

Each of the space portions 70 may be a space portion separated from the free space portion 71 at least partially by a wall (an example of the second object M3) or a movement prohibiting portion (an example of the second object M3). For example, each of the space portions 70 may have an entrance or exit (a second object M3, for example, a hole, a door, or the like) through which the user avatar M1 can enter or exit the free space portion 71. In each of the space portions 70, content may be provided to the user avatars M1 located in each of the space portions 70.

The type and number of contents (contents provided in virtual reality) provided in each of the space portions 70 are arbitrary. In this embodiment, as an example, the content provided in each of the space portions 70 includes digital content such as various types of video images. The video images may be real-time or non-real-time video images. Furthermore, the video images may also be video images based on real images or CG (computer graphics). The video image may be a video image for providing information. In this case, the video images may be an information-providing service (information-providing services related to travel, housing, food, fashion, health, beauty, or the like) of a specific genre, a broadcasting service (for example, You-Tube (registered trademark)) by a specific user, or the like.

The content provided by each of the space portions 70 may be various items available in the virtual space (examples of the second object M3), and the various items may include, for example, the specific objects described below. In this case, the space portions 70 providing the various items may be in a form of a sales office. Alternatively, the content provided in each of the space portions 70 may be an authority, tokens, or the like to acquire items available in reality. Additionally, some of the plurality of space portions 70 may be space portions that do not provide content.

Each of the space portions 70 may be operated by a different entity, similar to a real-life physical store. In this case, the administrator of each space portion 70 may use the corresponding space portion 70 by paying a fee for setting up a store, or the like to the administrator of this virtual reality generation system 1.

Furthermore, the virtual space may be expandable as the number of space portions 70 increases. Alternatively, a plurality of virtual spaces may be set up for each attribute of the content provided in each of the space portions 70. In this case, the virtual spaces may be discontinuous or contiguous with each other as "space portions" respectively.

(Drawing Function in Virtual Space)

The server controller 13 cooperates with the terminal devices 20 to display a display image for each terminal (hereinafter referred to simply as "terminal image") on the display portion 23, and updates the terminal image. In a modified example, the terminal image may be drawn by the terminal devices 20 (see FIG. 22 and the like).

Figure 3:
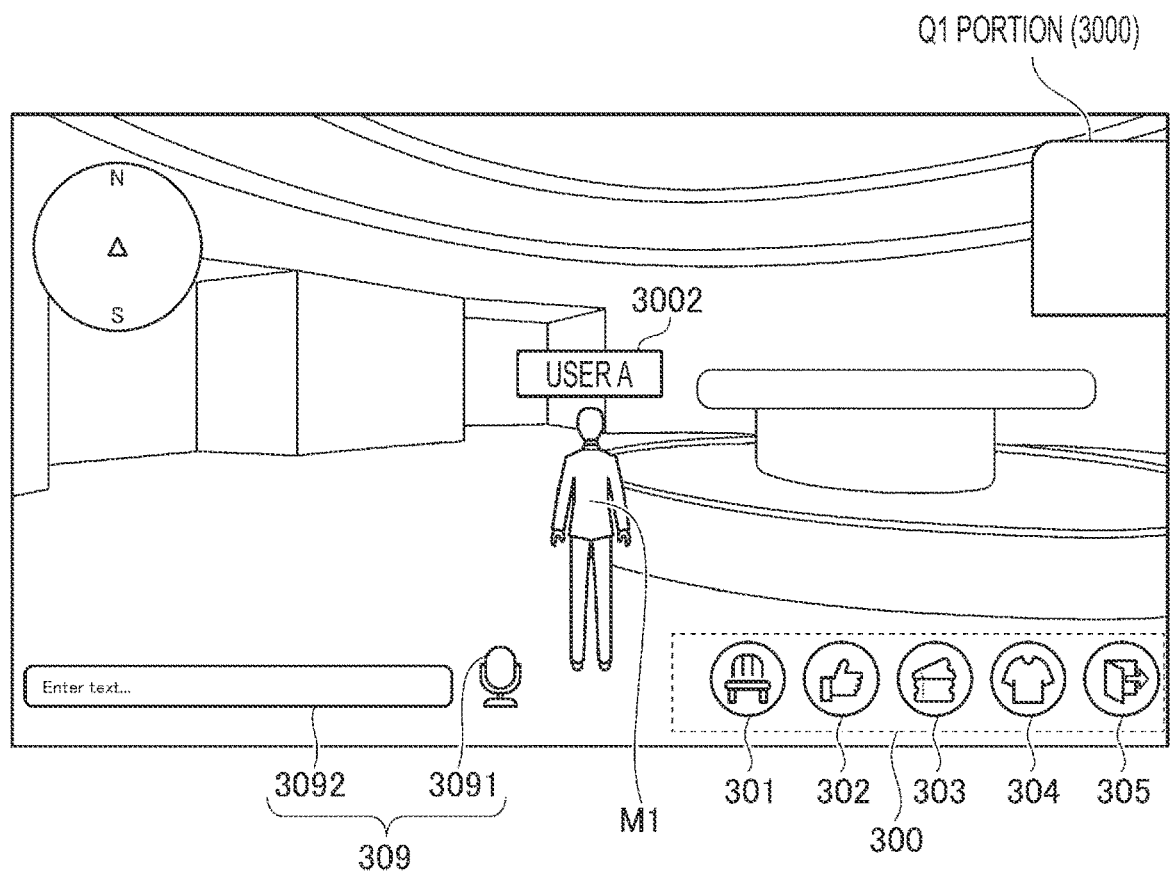
FIG. 3 is a diagram showing an example of a terminal image.

FIG. 3 is an explanatory view of a terminal image and a diagram showing an example of a terminal image. In FIG. 3, part of the virtual space is drawn with the user avatar M1 (user name "User A"). The terminal image may be drawn as a video image from a virtual camera 60 placed in the virtual space. In this case, a virtual camera 60 may be set for each user avatar M1. The virtual camera 60 may include a camera installed at a fixed point in addition to the camera for each user avatar M1.

Figure 4:
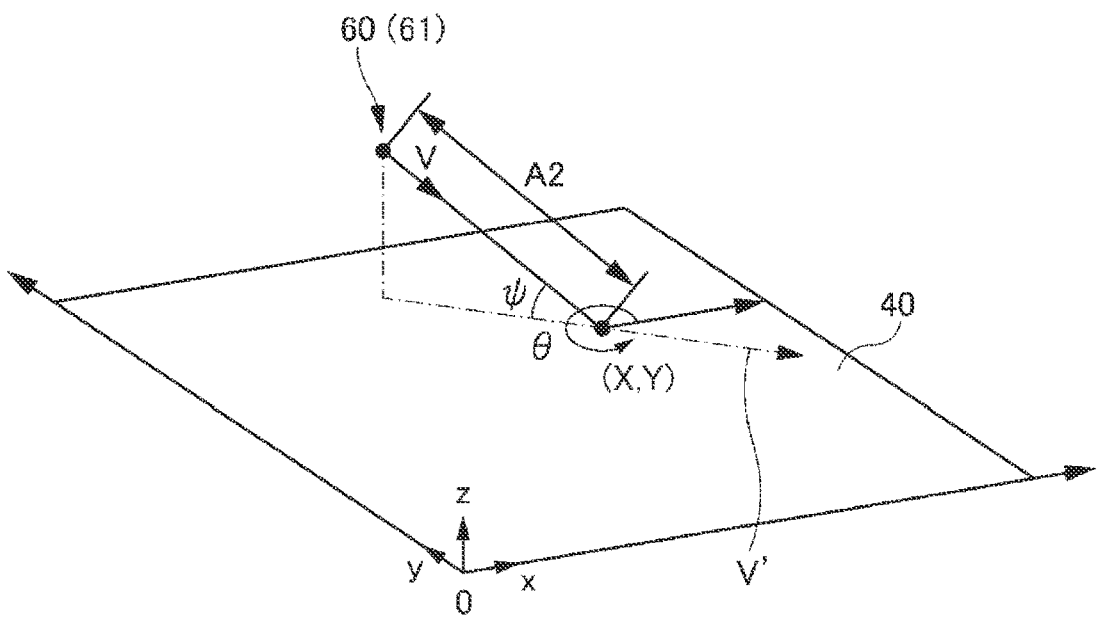
FIG. 4 is an explanatory view of camera parameters for a virtual camera.

FIG. 4 is an explanatory view of camera parameters for the virtual camera 60. FIG. 4 shows a field surface 40 positioned in a global coordinate system. The global coordinate system is a coordinate system that is fixedly associated with the virtual space. Unless otherwise specified, the field plane 40 represents the field plane 40 (field plane 40 of a field object) in which a field image is projected. The field surface 40 represents a field of the virtual space. For each of two or more discontinuous space portions, a field plane 40 may be set up that is discontinuous from each other in the global coordinate system.

In this embodiment, the camera parameters include two position parameters (X, Y), a distance parameter A2, an orientation parameter θ, and an angle-of-attack parameter ψ. Once values of all these parameters are determined, the virtual camera 60 can be uniquely positioned with respect to the global coordinate system. When the angle-of-attack parameter ψ is approximately 90 degrees, a bird's-eye view can be displayed.

The position parameter X is an x-coordinate of an intersection on the xy-plane in a line-of-sight direction V, the position parameter Y is a y-coordinate of the intersection on the xy-plane in the line-of-sight direction V, and the distance parameter A2 is a distance (distance along the line-of-sight direction V) from the intersection on the xy-plane in the line-of-sight direction V to the virtual camera 60 from the intersection on the xy-plane of the viewing direction V to the virtual camera 60. The orientation parameter θ is an angle between a projection vector V' on the xy-plane in the line-of-sight direction V and the x-axis. The angle-of-attack parameter ψ is an angle between the line-of-sight direction V and the xy-plane. Although the angle-of-attack parameter ψ is used in this embodiment, the angle-of-attack parameter ψ may be omitted. That is, the angle-of-attack parameter ψ may be a constant value (fixed value).

Respective values of some or all of these various camera parameters may be changed in conjunction with the values of the parameters pertaining to the user avatar M1 (for example, the position and state of the user avatar M1) and/or may be changed in response to input from the user. For example, respective values of the two position parameters (X, Y) may correspond to the position of the user avatar M1. These camera parameters are an example, and different parameters may be used equivalently in the actual process. For example, the camera parameters may include height relative to the xy-plane and rotation parameters around three orthogonal axes (that is, yaw, roll, and pitch). The camera parameters may also include other parameters such as focal length, and the like.

(Details of Dialog Promotion Function)

In this embodiment, the virtual space can also function as a place for dialog between users via each user avatar M1. In this case, for example, a plurality of users can make an appointment in advance to receive the content provided in a specific space portion(s) 70 at a predetermined time. In this case, a plurality of users can interact through the provision of content. Alternatively, a plurality of users can make an appointment in advance and gather at a specific space portion(s) 70 at a predetermined time to enjoy dialog or conversation (hereafter represented by "dialog").

Incidentally, to efficiently support dialog between users via each user avatar M1 in the virtual space, it is useful to effectively support the movement operation input of the avatars while effectively supporting dialog and the like via each avatar between the users in the virtual space.

Therefore, in this embodiment, as explained in detail below, the virtual reality generation system 1 has a dialog promotion function that efficiently supports dialog between each user via each user avatar M1 by appropriately switching the viewpoint of the virtual camera 60 that is associated with one user avatar M1. Furthermore, hereinafter, the viewpoint of the virtual camera 60 that is associated with one user avatar M1 means a relative viewpoint with respect to the one user avatar M1, and the relative viewpoint is uniquely determined based on the position/orientation information of the one user avatar M1.

Hereinafter, the server device 10 related to the dialog promotion function realizes an example of an information processing system, but as described below, each component of one specific terminal device 20 (see the terminal communicator 21 to the terminal controller 25 of FIG. 1) may realize an example of an information processing system, or a plurality of terminal devices 20 may cooperate to realize an example of an information processing system. Additionally, the server device 10 and one or more terminal devices 20 may cooperate to realize an example of an information processing system.

Figure 5:
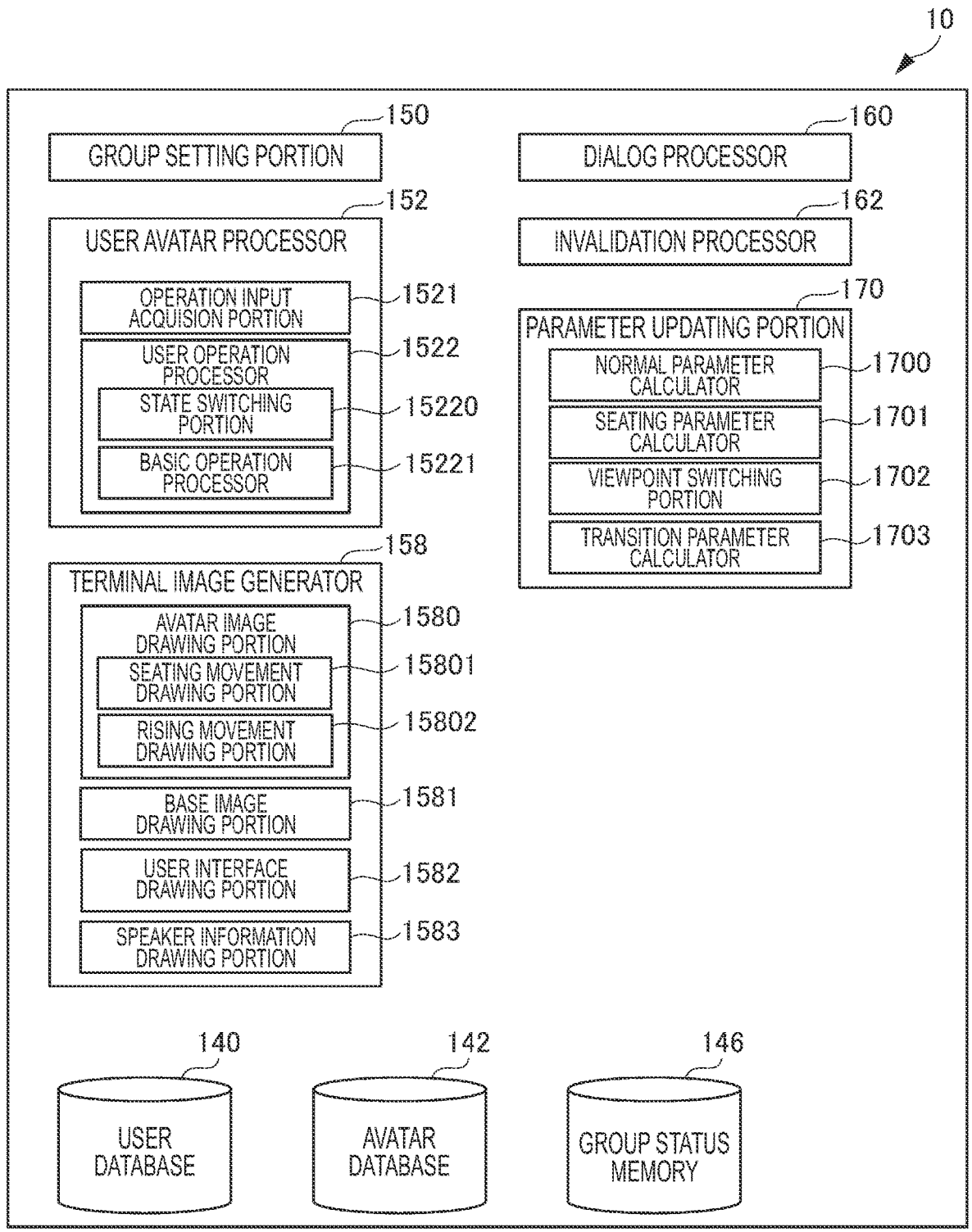
FIG. 5 is an example of a functional block diagram of a server device related to a dialog promotion function.
Figures 8, 9:
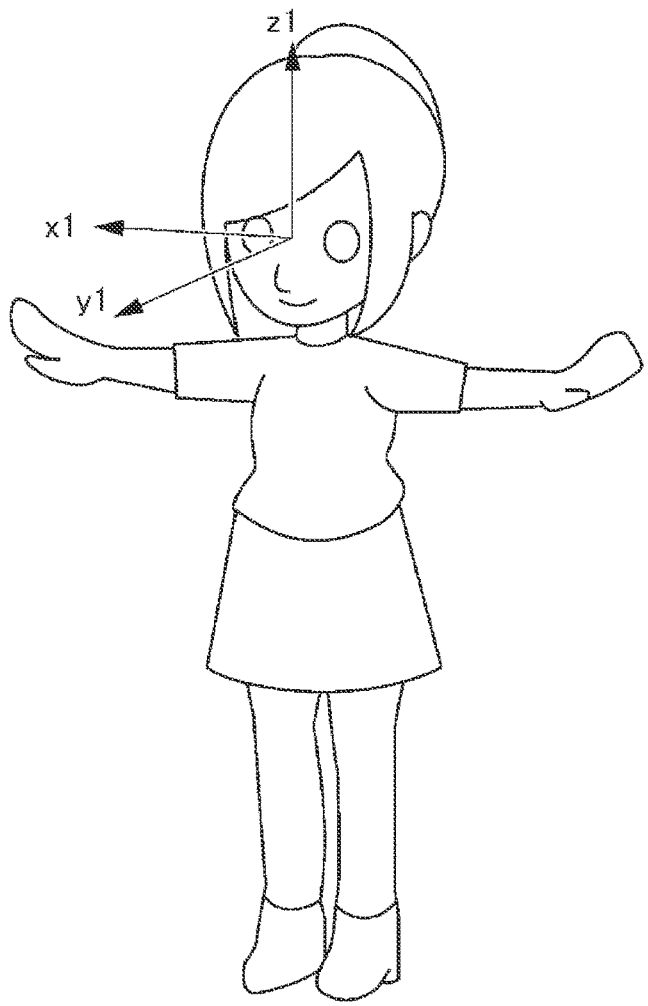
FIG. 8 is an explanatory view of data in a group status memory.
FIG. 9 is an explanatory view of position/orientation information of a user avatar.

FIG. 5 is an example of a functional block diagram of the server device 10 related to the dialog promotion function. FIG. 6 is an explanatory view of data in a user database 140. FIG. 7 is an explanatory view of data in an avatar database 142. FIG. 8 is an explanatory view of data in a group status memory 146. In FIGS. 6 to 8, "***" indicates that some information is stored, "-" indicates that no information is stored, and " . . . " indicates that a similar repetition is being made.

As shown in FIG. 5, the server device 10 has a user database 140, an avatar database 142, a group status memory 146, a group setting portion 150, a user avatar processor 152, a terminal image generator 158, a dialog processor 160 (an example of an output portion), an invalidation processor 162, and a parameter updating portion 170. Some or all of the functions of the server device 10 described below may be realized by the terminal devices 20, as appropriate (see FIG. 20). In addition, classification of the group status memory 146 from the user database 140 and classification of the group setting portion 150 to the parameter updating portion 170 are for convenience of explanation, and some functional portions may realize the functions of other functional portions. For example, respective functions of the group setting portion 150, the user avatar processor 152, the terminal image generator 158, and the dialog processor 160 may be realized by the terminal device(s) 20. Also, for example, some or all of the data in the user database 140 may be integrated into the data in the avatar database 142 or may be stored in a separate database.

Furthermore, the group status memory 146 from the user database 140 can be realized by the server memory 12 shown in FIG. 1, and the group setting portion 150 to the parameter updating portion 170 can be realized by the server controller 13 shown in FIG. 1. Additionally, part of the parameter updating portion 170 (the functional portion that communicates with the terminal device(s) 20) from the group setting portion 150 can be realized by the server communicator 11 together with the server controller 13 shown in FIG. 1.

User information is stored in the user database 140. In the example shown in FIG. 6, the user information includes user information 600 pertaining to the users.

In the user information 600, a user name, user authentication information, user avatar ID, position/orientation information, friend information, specific object IDs, and the like are associated with each user ID. The user name is a name registered by the user himself/herself and is arbitrary. User authentication information is information representing that the user is a legitimate user, and may include, for example, a password, email address, date of birth, a watchword, biometric information, or the like.

The user avatar ID is an ID to identify the user avatar. In this embodiment, one user avatar ID is associated with each user ID. Therefore, in the following explanations, "associated with a user (or user ID)" or similar expressions mean "associated with a user avatar ID" or similar expressions. However, in other embodiments, a single user ID may be associated with a plurality of user avatar IDs.

The position/orientation information includes the position information and the orientation information of the user avatar M1. Details of the position/orientation information are described below. Friend information may include information (for example, user ID) that identifies the user in a friend relationship. Hereinafter, each user avatar M1 for each user in a friend relationship is also referred to as a "friend avatar." The specific object ID is information that identifies the specific object described below. A plurality of specific object IDs may be associated with a single user avatar ID.

The avatar database 142 stores avatar information regarding the user avatars M1.

In the example shown in FIG. 7, avatar information 700 associates a face part ID, a hairstyle part ID, a clothing part ID, and the like with each user avatar ID. Parts information pertaining to appearance, such as the face part ID, the hairstyle part ID, and the clothing part ID, are parameters that characterize the user avatar M1, and may be selected by each corresponding user. For example, information pertaining to the appearance of the user avatar M1, such as the face part ID, the hairstyle part ID, and the clothing part ID, are prepared in multiple types. For the face part ID, parts IDs may be prepared for each type of face shape, eyes, mouth, nose, and the like, and information pertaining to the face part ID may be managed as a combination of IDs for each part comprising the face. In this case, based on each ID pertaining to the appearance associated with each avatar ID, it is possible to draw each user avatar M1 not only on the server device 10, but also on the terminal device 20 side.

Additionally, in the example shown in FIG. 7, the avatar information 700 associates with each user avatar ID (i) the status information of whether the user avatar is seated and (ii) a seating parameter value. In this embodiment, the state of the user avatar M1 is either a seated state (an example of a second state) or a non-seated state, but the non-seated state may be further subdivided.

In this embodiment, the non-seated state includes a movement-enabled state (an example of a first state) and a transition state. As described below, the transition state includes a transition state to seating and a transition state to rising. Furthermore, the movement-enabled state may be further subdivided. For example, the movement-enabled state may include a movement state, a stop state, and the like. A seating parameter is any parameter associated with seating and may include a plurality of parameters. The seating parameters may include, for example, a parameter representing seating time, a parameter representing seating frequency, and the like.

The group status memory 146 stores group status information regarding the state of groups active in the virtual space. Groups are set by the group setting portion 150 described below. In the example shown in FIG. 8, in the group status information 800, a corresponding group name and user IDs (user IDs related to users belonging to the corresponding group) are associated with each group ID. One group ID may be associated with a plurality of user IDs. A group may be referred to as a party.

The group setting portion 150 sets up a group constituted by one or more users who interact in the virtual space. For example, when each user enters the virtual space via the user avatar M1, he/she inputs a group name. In this case, the group setting portion 150 may set a group ID for each group name, and set users who entered the same virtual space name as the same group. In this case, a virtual space may be generated for each group so that each user in the group can share one virtual space. This allows, for example, a plurality of users who wish to interact in a virtual space to interact in a common virtual space without interacting with other users (users in different groups) by entering a common virtual space name that has been notified in advance. Furthermore, since the virtual space can be managed by groups, the amount of information regarding other users transmitted to the terminal device(s) 20 that correspond to a single user can be reduced compared to the case in which many users share a single virtual space, thus reducing the communication load for the virtual reality generation system 1 as a whole. In a modified example, one virtual space may be available to users belonging to a plurality of groups at the same time. Hereinafter, unless otherwise specified, each user avatar M1 is assumed to belong to the same group.

Additionally, when one user enters the virtual space via the user avatar M1, the group setting portion 150 may display group information currently set on the terminal device 20 that is associated with the one user in cooperation with the terminal image generator 158. In this case, the group information may include a group name and information representing its members (user names and the like). Furthermore, the display of the group name may also function as a selection button. In this case, a user who finds a display of a desired group name can easily join the desired group by operating the corresponding selection button. The participation in the group may require permission from the user(s) who is/are a member(s) of the group.

In other embodiments, the group setting portion 150 may assign each user to one of a plurality of groups without being based on input from the user. In this case, the assignment may be achieved so that the number of users in one group is equalized. This allows equalizing the balance of processing load for each group. In this case, the group setting portion 150 may assign users whose times of entry are close to each other to the same group, or may assign users according to their attribute information (age, gender, preferences, or the like).

The user avatar processor 152 executes various processes for each user avatar M1. The user avatar processor 152 includes, for each user avatar M1, an operation input acquisition portion 1521 (an example of an acquisition portion) and a user operation processor 1522.

The operation input acquisition portion 1521 acquires operation input information generated in response to various operations by the user. The operation input information by the user is generated via the input portion 24 of the terminal device 20 described above.

In this embodiment, the operation input information may include an operation input (an example of the first input) that changes the position of the user avatar M1 in the virtual space, an operation input that changes the values of other parameters (parameters for avatar actions other than movement) such as the orientation of the user avatar M1, an operation input that is generated via user interface (UI) that is drawn by a user interface drawing portion 1582, and an input for dialog (an example of a third input) such as voice or text (including characters, symbols, patterns, or the like) used in the dialog processor 160. An operation input generated via a user interface includes an operation input via a chair button 301 (an example of a second input), which is described below.

Hereinafter, an operation input that changes the position of the user avatar M1 in the virtual space is an operation input that moves the user avatar M1, and is hereinafter also referred to as a "movement operation input." Additionally, an operation input that changes the orientation of the user avatar M1 as a whole is hereinafter also referred to as an "overall orientation operation input." An operation input (an example of a fourth input) that changes the orientation of a specific part (to be described below) among all the parts that form one user avatar M1 is also referred to as "parts-oriented operation input."

The movement operation input, the overall orientation operation input, the parts-oriented operation input, and the like may be generated by operating specific keys (for example, "WASD" keys), via user interfaces including arrow buttons or the like, or via voice or movements such as gestures. Hereinafter, as an example, the movement operation input, the overall orientation operation input, and the parts-oriented operation input are generated by the operation of specific keys (for example, "WASD" keys).

In this embodiment, as an example, the movement operation input, the overall orientation operation input, and the parts-oriented operation input are each treated as different inputs, but are generated via the same user interface. Specifically, the "WASD" keys, which are specific keys, function as a movement operation input or an overall orientation operation input when the user avatar M1 is in a movement-enabled state described below, and may function as parts-oriented operation input when the user avatar M1 is in a seated state described below. This effectively increases the variation of operation input while reducing the complexity of the user interface.

In this embodiment, the user operation processor 1522 includes a state switching portion 15220 and a basic operation processor 15221 (an example of a position changing portion).

The state switching portion 15220 switches the state of each user avatar M1 between a seated state and a movement-enabled state. In a modified example, the movement-enabled state may be further subdivided as described above. In this case, the state switching portion 15220 may switch the state of each user avatar M1 between three or more states. In this embodiment, when the state switching portion 15220 switches the state of each user avatar M1 between the seated state and the movement-enabled state, it is switched via a transition state. The transition state is a state pertaining to the transition between the seated state and the movement-enabled state, and is described in detail below.

When a predetermined seating condition (an example of a predetermined first switching condition) is established, the state switching portion 15220 switches the movement-enabled state of the user avatar M1 to the seated state. The predetermined seating condition may be determined for each user avatar M1 or for a plurality of user avatars M1. In this embodiment, as an example, the predetermined seating condition is determined for each user avatar M1.

The predetermined seating condition is arbitrary, but in this embodiment, as an example, the predetermined seating condition for one user avatar M1 is satisfied when a seating instruction pertaining to the user associated with the user avatar M1 is generated. The seating instruction pertaining to the user may be generated via the user interface (chair button 301) generated by a user interface drawing portion 1582 described below. In this case, the predetermined seating condition pertaining to one user avatar M1 may be established regardless of the position of the one user avatar M1. In this case, the user may switch the state of the user avatar M1 to the seated state at any location. This allows the user to, for example, reach the seated state of the user avatar M1 on the spot and interact with users of other user avatars M1 without having to move the user avatar M1 to the dialog-only space portion that can be set up in the virtual space, thereby improving convenience.

In other embodiments, the state switching portion 15220 may switch the state of the user avatar M1, which is a movement-enabled state, in response to a seating instruction pertaining to the user corresponding to one user avatar M1, when the one user avatar M1 is located within a specific area in the virtual space. In this case, the specific area is part of an area in the virtual space and may be a fixed or changing area. For example, the specific area may include the areas other than a seating prohibited area, among all the areas in the virtual space. In this case, the seating prohibited area may include an area that interferes with the field of view of each user avatar M1 (an area reflected in the terminal image). Furthermore, in this case, the seating prohibited area may change accordingly when the field of view of each user avatar M1 changes. Alternatively, the specific area may include an area(s) among the entire area in the virtual space, in which the user avatar M1 can be positioned. In this case, in effect, the condition regarding the position of the user avatar M1 is unconditionally satisfied.

The state switching portion 15220 switches the state of a seated user avatar M1 when a predetermined seating release condition (an example of a predetermined second switching condition) is established. The predetermined seating release condition may be determined for each user avatar M1 or for a plurality of user avatars M1. In this embodiment, as an example, the predetermined seating release condition is determined for each user avatar M1.

The predetermined seating release condition is arbitrary and may be determined based on, for example, a seating parameter pertaining to a user avatar M1 in the seated state. Additionally, the predetermined seating release condition may be determined based on a dialog situation pertaining to the user avatar M1 in the seated state. For example, the predetermined seating release condition may be satisfied when there has been no dialog by the user avatar M1 in the seated state for a fixed period of time or longer. In this case, the presence or absence of dialog may be determined by the presence or absence of voice, or by the presence or absence of the user avatar M1 of a dialog partner or the like. In this embodiment, as an example, the predetermined seating release condition pertaining to one user avatar M1 is satisfied when a release instruction pertaining to the user associated with the one user avatar M1 is generated. The release instruction pertaining to the user may be generated via the user interface (chair button 301) generated by the user interface drawing portion 1582 described below.

The basic operation processor 15221 determines the position and orientation of each user avatar M1 in the virtual space, based on the operation input information (movement operation input, overall orientation operation input, and parts-oriented operation input) acquired by the operation input acquisition portion 1521. The position/orientation information of each user avatar M1 may be information based on the global coordinate system (see FIG. 4).
The position/orientation information of each user avatar M1 determined by the basic operation processor 15221 may be stored (updated), for example, in association with the corresponding user ID (see FIG. 6). Additionally, the basic operation processor 15221 may also determine various movements of the hands, face and the like of the user avatar M1, based on the operation input information.

In this embodiment, the position/orientation information of one user avatar M1 may only include information representing the position and orientation of the one user avatar M1 as a whole (hereinafter, when distinguishing, also referred to as "position/orientation information pertaining to a representative point of user avatar M1"). Alternatively, the position/orientation information of one user avatar M1 may include information representing the position and orientation of each of the plurality of parts of the one user avatar M1 (hereinafter, when distinguishing, also referred to as "position/orientation information pertaining to the parts of the one user avatar M1"). For example, in the case of the user avatar M1 having one or more specific parts whose orientation can be changed, the position/orientation information of the user avatar M1 may include information representing the orientation of the one or more specific parts. In this case, the specific parts may be, for example, a face, an upper body, eyes, or the like.

For example, FIG. 9 shows a local coordinate system (x1, y1, and z1 axes) pertaining to the orientation of a face part as an explanatory view of position/orientation information of the user avatar M1. The origin of the local coordinate system may be set at the center (for example, center of gravity) of the face part of the user avatar M1. In this case, the orientation of the face part may be specified by angles of rotation around the x1, y1, and z1 axes, respectively. A variable range of the rotation angle around each of the x1, y1, and z1 axes may be set according to the attributes of the specific part.

From the same perspective, the position/orientation information of one user avatar M1 may also include position information of various joints of the one user avatar M1. The various joints of the user avatar M1 may include joints corresponding to part or all of the human joints (joints pertaining to limbs, neck, fingers, and the like). The position information of the various joints of the user avatar M1 may be generated based on the position information of the various joints of the corresponding user. In this case, the position information of the various joints of the user may be generated in the terminal device 20 using motion capture technology as operation input information.

The terminal image generator 158 draws each virtual reality medium (for example, user avatar M1) and the like that can move within the virtual space. Specifically, the terminal image generator 158 generates a terminal image that is displayed on the terminal device(s) 20 pertaining to each user, based on the avatar information 700 (see FIG. 7), the position/orientation information of each user avatar M1, and the like.

For example, the terminal image generator 158 generates, for each user avatar M1, an image (terminal image) to be displayed on the terminal device 20 pertaining to the user associated with one user avatar M1, based on the position/orientation information of the one user avatar M1. Specifically, based on the position/orientation information of one user avatar M1, the terminal image generator 158 generates, as a terminal image, an image of the virtual space as seen from the virtual camera 60 (image that cuts out part of the virtual space) at the position and orientation corresponding to the position/orientation information. In this case, since the position/orientation information pertaining to each user avatar M1 is different from each other, the terminal image will be different for each user pertaining to each user avatar M1. Hereinafter, in consideration of this point, the terminal image generated based on the position/orientation information of the user avatar M1 pertaining to one user may be referred to as the terminal image for one user. Hereinafter, unless otherwise specified, the functions of the terminal image generator 158 in generating a terminal image pertaining to one user (and the user avatar M1 associated with that user) are explained below, but the same is substantially true for generating a terminal image for other users.

In this embodiment, the terminal image generator 158 has a plurality of modes, such as a first-person viewpoint mode and a third-person viewpoint mode. For example, in the first-person viewpoint mode, the terminal image generator 158 aligns the position and orientation (each value of the camera parameters) of the virtual camera 60 with the position and orientation corresponding to the position/orientation information of one user avatar M1. In this case, the field of view of the virtual camera 60 substantially matches the field of view of the one user avatar M1. Additionally, in this case, the user avatar M1 will not appear in the field of view from the virtual camera 60. This allows the user pertaining to one user avatar M1 to grasp the state of the surroundings (for example, friend avatars) from the viewpoint of the one user avatar M1. As a result, it is easier for the user to concentrate on a specific activity, for example, concentrating on dialog or viewing content.

On the other hand, in a third-person viewpoint mode, the terminal image generator 158 aligns the position of the virtual camera 60 with a position slightly away from the position of one user avatar M1. At this time, the terminal image generator 158 may determine respective values of the other camera parameters of the virtual camera 60 according to the position/orientation information of one user avatar M1. At this time, the viewpoint of the virtual camera 60 may be set at a position slightly behind and to the side of the user avatar M1 so as to generate a terminal image in which the user avatar M1 is reflected. This allows the user pertaining to one user avatar M1 to grasp the state of the one user avatar M1 in the virtual space from a third-person viewpoint. As a result, the user can check the state of the one user avatar M1 from a relatively wide view of the surrounding situation, which helps to facilitate operations (for example, operations in a desired direction of movement) pertaining to the one user avatar M1.

The details of the first-person viewpoint mode and the third-person viewpoint mode will be described below in relation to a viewpoint switching portion 1702 described below.

Other modes other than the first-person viewpoint mode and the third-person viewpoint mode may be set. For example, in another mode, the values of various camera parameters of the virtual camera 60 may be arbitrarily adjusted by the corresponding user.

If another user avatar M1 is positioned within the field of view of the virtual camera 60, the terminal image generator 158 generates a terminal image including the other user avatar M1. However, in this case, the other user avatar M1 may be drawn in a relatively simple manner (for example, in a form of a two-dimensional sprite) to reduce the load on the drawing process.

The terminal image generator 158 may draw user name information 3002 representing a user name (for example, "User A" in FIG. 3) in association with each user avatar M1. The user name information 3002 is arbitrary and may include a text of the user name. This allows each user to identify the user avatar M1 pertaining to the desired user based on the user name. The user name may be able to be "non-display," based on a user setting.

In this embodiment, the terminal image generator 158 includes an avatar image drawing portion 1580, a base image drawing portion 1581, a user interface drawing portion 1582, and a speaker information drawing portion 1583.

The avatar image drawing portion 1580 draws a portion pertaining to the user avatar(s) M1 in the terminal image as described above. Specifically, the avatar image drawing portion 1580 draws one or more user avatars M1 that can be positioned in the field of view of the virtual camera 60, based on the values of each camera parameter of the virtual camera 60, the position/orientation information of each user avatar M1, the avatar information 700 (see FIG. 7), and the like. Furthermore, the drawing of the user avatar M1 by the avatar image drawing portion 1580 may be superimposed on the base image described below.

Additionally, as described above, when the position/orientation information of one user avatar M1 includes information representing the position and orientation of each of the plurality of parts of the user avatar M1, the avatar image drawing portion 1580 may express the position and orientation of each of the plurality of parts of the user avatar M1, based on the information. As a result, the movement of the user avatar M1 can be expressed more naturally. For example, when the specific part is the upper body, it is possible to express the movement of twisting the upper body with respect to the lower body.

Furthermore, as described above, if the position/orientation information of one user avatar M1 includes position information of the various joints of the one user avatar M1, the avatar image drawing portion 1580 may draw the user avatar M1 so that the various joint positions of the user avatar M1 are consistent with such information.

Regarding a user avatar M1 positioned in the field of view of the virtual camera 60, the avatar image drawing portion 1580 draws the user avatar M1 in a different manner depending on the state (seated or non-seated state) of the user avatar M1.

Figure 10:
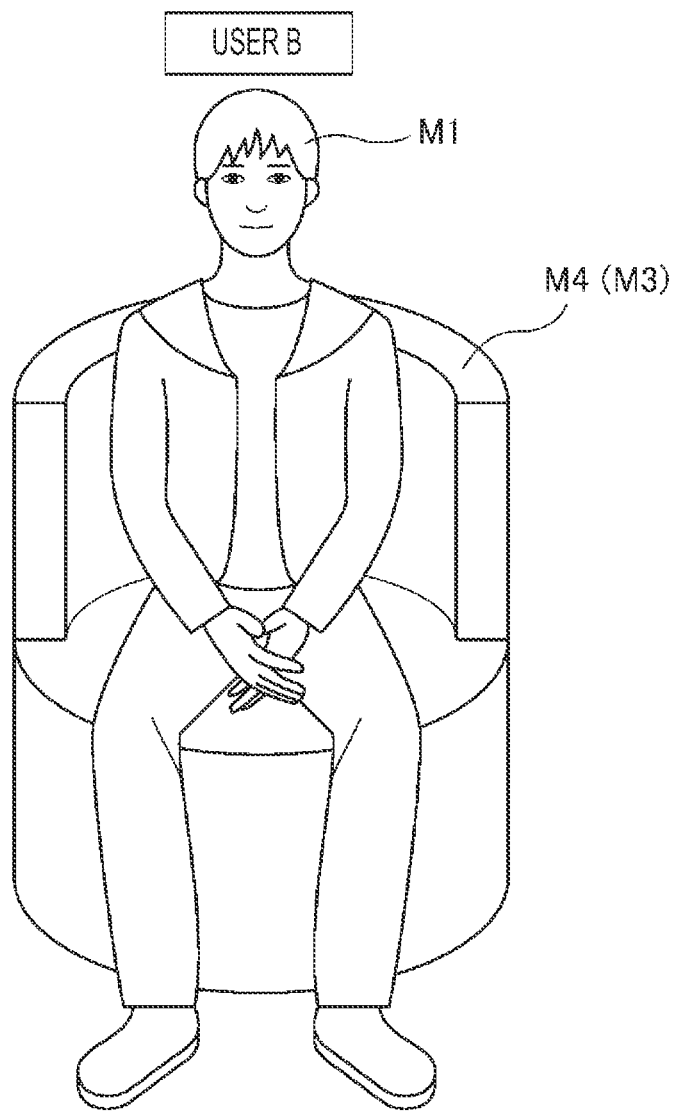
FIG. 10 is a diagram showing an example of a terminal image depicting a seated user avatar.

Specifically, when the user avatar M1 is seated, the avatar image drawing portion 1580 draws the user avatar M1 in a manner representing the seated state of the user avatar M1. More specifically, as shown in FIG. 10, the avatar image drawing portion 1580 draws the user avatar M1 seated on a specific object M4 which is a second object M3. In this case, the specific object M4 is arbitrary and may be a second object M3, such as a chair or sofa, corresponding to an object on which a real human being can sit. In other words, the specific object M4 has a form of a chair or similar object. However, the specific object M4 may be a second object M3 corresponding to an animal, such as a horse or camel, or a second object M3 corresponding to the ground (field object) or a rug thereon.

When the user avatar M1 is in a non-seated state (for example, a movement-enabled or transitional state), the avatar image drawing portion 1580 draws the user avatar M1 in a manner that shows the non-seated state of the avatar. For example, the avatar image drawing portion 1580 draws the user avatar M1 in a manner that a movement state in which user avatar M1 is moving, based on the operation input information including the movement operation input. In this case, the avatar image drawing portion 1580 may express the movement of the limbs of the user avatar M1. Additionally, in a situation in which no operation input has been obtained, the avatar image drawing portion 1580 may draw the user avatar M1 in a manner representing a stationary state in which the user avatar M1 is not moving. However, the avatar image drawing portion 1580 may add some movement to the user avatar M1 so that it does not become unnatural for the avatar to remain stationary for a fixed period of time or longer.

When the user avatar M1 is not seated, the avatar image drawing portion 1580 may draw one user avatar M1 without considering the position/orientation information pertaining to the parts of the one user avatar M1. This is because when the user avatar M1 is not seated, the position/orientation information pertaining to the parts of the user avatar M1 is less important than when the user avatar M1 is seated. In particular, under the situation in which the movement operation input pertaining to the user avatar M1 has been acquired, a movement state in which the user avatar M1 is moving may be drawn, based only on the position/orientation information pertaining to the representative point of the user avatar M1. This can efficiently reduce the load on the drawing process without significantly lowering the amount of information in the terminal image.

Additionally, when one user avatar M1 is seated, the avatar image drawing portion 1580 may change the orientation of a specific part of the user avatar M1, based on the above-mentioned parts-oriented operation input for the one user avatar M1 (that is, position/orientation information pertaining to the specific part of the one user avatar M1). This allows the user to communicate with other user avatars M1 (for example, friend avatars) using not only words, but also the movement of the user avatar M1.

Furthermore, instead of or in addition to using the parts-oriented operation input, the avatar image drawing portion 1580 may, when one user avatar M1 is in a state of making a vocal sound, identify the dialog partner based on an analysis of the previous dialog content, and change the orientation of the specific part of the one user avatar M1 so that the specific part faces the user avatar M1 pertaining to the identified dialog partner.

For example, if there is dialog in the following order,
1. The user avatar M1 related to the user name "User A" says "Hello."
2. The user avatar M1 related to the user name "User B" says "Hello, Mr. A."
3. The user avatar M1 related to the user name "User C" says "Mr. B, it's been a long time."
4. The user avatar M1 related to the user name "User A" asks "What shall we do today?"

when the user avatar M1 pertaining to user name "User B" makes a vocal sound in 2, since it is after a vocal sound by the user avatar M1 pertaining to user name "User A", it is possible to make the whole or a specific part of the user avatar M1 pertaining to user name "user B" face the user avatar M1 pertaining to user name "User A", and/or the whole or a specific part of the user avatar M1 may be moved by a specific movement. When moving by a specific movement, for example, by moving the hand part of the user avatar M1 pertaining to the user name "user B" in a manner in which a person is waving, the reaction is shown to the user avatar M1 pertaining to the person making a vocal sound. The same is true when the user avatar M1 pertaining to the user name "user C" makes a vocal sound in 3. Additionally, a recognition result of a keyword (for example, user name) included in the voice content may also be used. For example, when the user avatar M1 pertaining to the user name "user B" makes a vocal sound in 2, since the voice content includes "Mr. A", "the whole or a specific part of the user avatar M1 pertaining to the user name "user B" may be directed to the user avatar M1 pertaining to the user name "User A."

In this embodiment, the avatar image drawing portion 1580 includes a seating movement drawing portion 15801 and a rising movement drawing portion 15802.

When the state of one user avatar M1 is switched from the movement-enabled state to the seated state by the state switching portion 15220 of the user movement processor 1522, the seating movement drawing portion 15801 draws the user avatar M1 in a transition state related to the transition from the movement-enabled state to the seated state. Specifically, the seating movement drawing portion 15801 draws the seating movement of the user avatar M1 into the seating posture by animation. In this embodiment, the seating movement drawing portion 15801 draws the seating movement by animation while transitioning from the third-person viewpoint mode to the first-person viewpoint mode. At this time, the seating movement drawing portion 15801 may draw the seating movement by animation while making the specific object M4 on which to be seated appear. An example of the animation of the seating movement will be described below in relation to the viewpoint switching portion 1702 with reference to FIGS. 15 to 17 described below.

The seating movement drawing portion 15801 may determine the seating position and the seating posture (orientation), based on the position/orientation information related to the representative point of the user avatar M1 when the seating instruction is generated. Therefore, the user can realize a seated state in a desired seating position and seating posture (orientation) by adjusting the position and orientation of the user avatar M1 as a whole. This makes it easier for the individuality of the user avatar M1 to appear and promote dialog between users, as compared with the case in which, for example, the seating posture (orientation) is automatically determined according to the seating position.

When the state of one user avatar M1 is switched from the seated state to the movement-enabled state by the state switching portion 15220 of the user movement processor 1522, the rising movement drawing portion 15802 draws the user avatar M1 in a transition state related to the transition from the seated state to the movement-enabled state. Specifically, the rising movement drawing portion 15802 draws the rising movement of the user avatar M1 from the seating posture by animation. In this embodiment, the rising movement drawing portion 15802 draws the rising movement by animation while transitioning from the first-person viewpoint mode to the third-person viewpoint mode. The rising movement may be drawn in a manner that is substantially the opposite of the above-mentioned seating movement.

The base image drawing portion 1581 draws a basic portion of the terminal image as described above. That is, the base image drawing portion 1581 draws the basic portion before the drawing by the avatar image drawing portion 1580 or the user interface drawing portion 1582 is superimposed. For example, based on the drawing information of the virtual space, the value of each camera parameter of the virtual camera 60, various information related to the second object(s) M3, and the like, the base image drawing portion 1581 draws (i) the virtual space itself (a portion excluding the second object(s) M3 and the like) that is in the field of view from the virtual camera 60, and (ii) the second object (s) M3 in the virtual space. The drawing information of the virtual space may be prepared in advance, but may be updated after the fact or dynamically, or the like. Each position in the virtual space may be defined in the global coordinate system (see FIG. 4). The drawing method of the virtual space is arbitrary, but may be realized by, for example, mapping a field object or a background object to an appropriate plane, curved surface, or the like.

The user interface drawing portion 1582 draws a user interface that enables various operations by the user. Items that can be operated via the user interface are arbitrary. For example, in the example shown in FIG. 3, the user interface includes a main interface 300, which comprises the chair button 301, a like button 302, a ticket management button 303, a friend management button 304, and an exit button 305. Further, in the example shown in FIG. 3, the terminal image includes a dialog interface 309, which is another user interface.

The chair button 301 is operated when switching the state of the user avatar M1 between the above-described seated and non-seated states. For example, each user can generate the above-described seating instructions by operating the chair button 301 when they want to talk without rushing via the user avatar M1.

In this embodiment, when the chair button 301 is operated while the user avatar M1 is in the seated state, the above-described release instruction is generated. In this case, the chair button 301 generates different instructions (seating instruction or release instruction) depending on whether the user avatar M1 is in the seated state or in the movement-enabled state.

The form of the chair button 301 is arbitrary, but in the example shown in FIG. 3, it is in the form of a chair. In this case, an intuitive and easy-to-understand user interface can be realized.

In the user interface drawing portion 1582, the chair button 301 pertaining to one user avatar M1 may be drawn in a different manner depending on whether the state of the one user avatar M1 is a seated state or is a movement-enabled state. For example, in the user interface drawing portion 1582, the color, form, and the like of the chair button 301 may be made different depending on whether the state of one user avatar M1 is the seated state or the movement-enabled state. Alternatively, in a modified example, a button for a seating instruction and a button for a release instruction may be drawn separately. In this case, the button for the seating instruction may be drawn to be operable when the user avatar M1 is in the movement-enabled state, and may be drawn to be inoperable when the user avatar M1 is in the seated state. Additionally, the button for the release instruction may be drawn to be inoperable when the user avatar M1 is in the movement-enabled state and operable when the user avatar M1 is in the seated state.

The like button 302 is operated when providing a good rating, gift, or the like to another user avatar M1 via the user avatar M1.

The ticket management button 303 is operated when outputting a ticket management screen (undepicted) that enables viewing of various ticket statuses.

The friend management button 304 is operated when outputting a friend management screen (undepicted) relating to another user avatar M1 having a friend relationship.

The exit button 305 is operated when exiting the user avatar M1 from the virtual space.

The speaker information drawing portion 1583, in cooperation with the dialog processor 160 described later, draws information suggesting or representing which user avatar M1 the speaker is. That is, the speaker information drawing portion 1583, in cooperation with the dialog processor 160 described below, expresses the user avatar M1's state of making a vocal sound.

Specifically, the speaker information drawing portion 1583 may use predetermined images associated with each user avatar M1, and emphasize a predetermined image associated with one user avatar M1 in the state of making a vocal sound as compared to predetermined images associated with other user avatars M1 (for example, the user avatars M1 positioned around the one user avatar M1).

The predetermined image associated with each user avatar M1 is an image drawn at a position away from the corresponding user avatar M1, and may be in a form of, for example, an avatar icon representing each user avatar M1.

Figure 11:
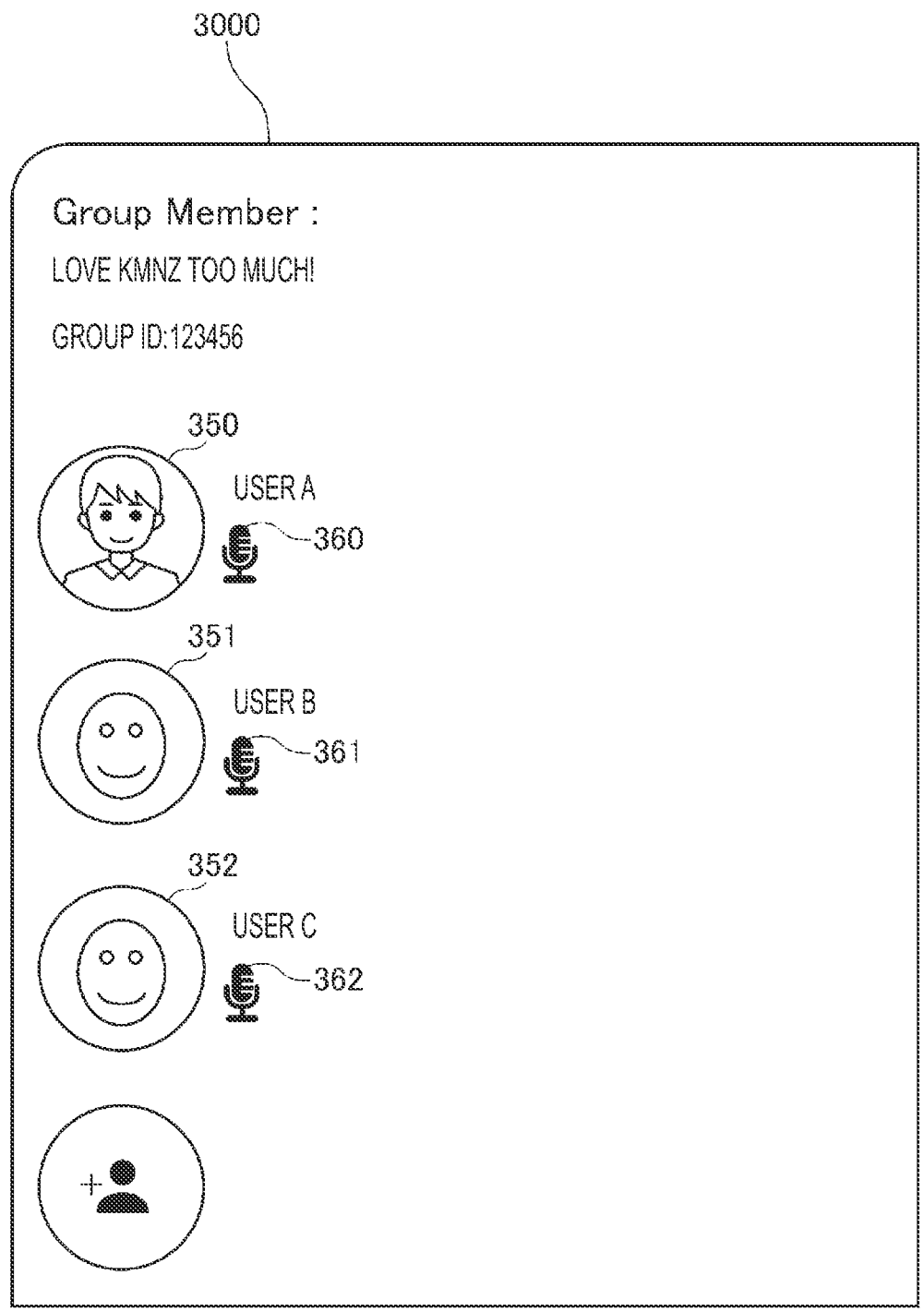
FIG. 11 is a diagram showing a group information display area that is part (Q1 part) of the terminal image shown in FIG. 3.

FIG. 11 shows a group information display area 3000 which is part (Q1 part) of the terminal image shown in FIG. 3. The groups displayed in the group information display area 3000 correspond to the groups set by the group setting portion 150. The group information display area 3000 includes avatar icons 350, 351, and 352 of respective user avatars M1 in the same group. Each of the avatar icons 350, 351, and 352 is associated with a corresponding user name (for example, "User A", "User B", and the like). In this case, when the user avatar M1 pertaining to the user name "User A" is making a vocal sound, the avatar icon 350 may be emphasized. The emphasis method is arbitrary, but may be realized, for example, by (i) changing brightness or color of an outline portion or the outside of the avatar icon pertaining to the user avatar M1 in the state of making a vocal sound, (ii) blinking the outline portion of the avatar icon pertaining to the user avatar M1 in the state of making a vocal sound, (iii) increasing a line thickness of the outline portion of the avatar icon pertaining to the user avatar M1 in the state of making a vocal sound, or (iv) any combination thereof.

Alternatively, the predetermined image may be another icon that may be drawn in association with the avatar icon. In this case, the other icons may be microphone icons 360, 361, 362, as shown in FIG. 11. In this case as well, among the microphone icons 360, 361, and 362, the microphone icon corresponding to the user avatar M1 in the state of making a vocal sound may be emphasized in the same manner (for example, enlargement of size, blinking, coloring, and the like). In this case, the size of the microphone icon may be changed depending on the magnitude (volume) of the voice.

Additionally, a predetermined image may be drawn in association with the user avatar M1. For example, when one user avatar M1 transitions to the state of making a vocal sound, the predetermined image may be drawn in association with the one user avatar M1. For example, a predetermined image in a form of a megaphone may be drawn above the head of the one user avatar M1. In this case, the predetermined image may be changed to a "non-display" state when the user avatar M1 has finished making a vocal sound.

Furthermore, the predetermined image may be the user name information 3002 (see FIG. 3) representing the user name. In this case, the emphasis method is arbitrary, but may be realized, for example, by (i) changing brightness or color of an outline portion or the outside of the user name information 3002 pertaining to the user avatar M1 in the state of making a vocal sound, (ii) blinking the outline portion of the user name information 3002 pertaining to the user avatar M1 in the state of making a vocal sound, (iii) increasing a line thickness of the outline portion of the user name information 3002 pertaining to the user avatar M1 in the state of making a vocal sound, or (iv) any combination thereof.

Additionally, in other embodiments, when one user avatar M1 is in a state of making a vocal sound, a predetermined image in a form of a line or arrow may be drawn toward a user avatar M1 of the dialog partner. In this case, the predetermined image in a form of a line or arrow may be drawn in such a way that a starting point is associated with the one user avatar M1 and an ending point is associated with the user avatar M1 of the dialog partner. Additionally, the user avatar M1 of the dialog partner may be estimated based on analysis of the dialog content, as described above. Alternatively, a collider (collision determination) may be adjusted by the volume of the voice, and the user avatar M1 that is determined to be in contact may be identified as a dialog partner.

Alternatively, the speaker information drawing portion 1583 may be realized by the avatar image drawing portion 1580. In this case, the avatar image drawing portion 1580 may express the state of making a vocal sound of the user avatar M1 by moving the face (for example, mouth) and/or limbs of the user avatar M1. In this case, the movements of the face (for example, mouth) and/or limbs of the user avatar M1 may be fixed by animation or may be realized in a manner based on gesture input from the user. In the case of gesture input, various movements of the user's face may be recognized, based on the user's face image using a camera (an example of the input portion 24) of the terminal device 20. In this case, recognition of various movements of the user's face may be realized by a face tracking function that may be installed in the terminal device 20. The movements of the face (for example, mouth) or limbs of the user avatar M1 to express such a state of making a vocal sound may be drawn only when the user avatar M1 is in the seated state. In this case, for example, the processing load on the terminal device 20 side and the processing load on the drawing processing of the avatar image drawing portion 1580 can be reduced compared to the case in which the face tracking function operates constantly. Additionally, when one user avatar M1 is in a state of making a vocal sound, the avatar image drawing portion 1580 may emphasize the one user avatar M1 compared to other user avatars M1 (for example, the user avatars M1 positioned around the one user avatar M1). The emphasis method is arbitrary, but may be realized, for example, by (i) changing brightness or color of an outline portion or the outside of the user avatar M1 in a state of making a vocal sound, (ii) blinking the outline portion of the user avatar M1 in the state of making a vocal sound, (iii) increasing a line thickness of the outline portion of the user avatar M1 in the state of making a vocal sound, or (iv) any combination thereof.

The dialog processor 160 executes dialog processing pertaining to dialog between users via the network 3, based on inputs from a plurality of users. The dialog between users may be realized in a text and/or voice chat format via their own respective user avatars M1. For example, the dialog interface 309 of the terminal image shown in FIG. 3 may be used for input for the dialog. In this case, a user can input voice by operating a microphone icon 3091 and making a vocal sound, and can input text by inputting text in a text input area 3092. This enables dialog between the users. The text may be drawn on each terminal image (each terminal image related to each user engaging in dialog with each other) in a dialog format in which a certain number of histories remain. In this case, for example, the text may be output separately from the image related to the virtual space, or may be output superimposed on the image related to the virtual space.

The dialog processor 160 may execute the dialog processing for each group so that the dialog is realized only within the same group. In this case, each user can enjoy the dialog with peace of mind because the vocal content is not known to users outside the group. Further, when a user avatar M1 is seated, the dialog processor 160 may mute or reduce the volume of a sound in the virtual space (for example, predetermined music that is constantly playing, or the like) to enhance the ease of listening to the voice chat (voice dialog).

In this embodiment, the dialog processor 160 may realize (i) dialog processing between user avatars M1 in the seated state and (ii) dialog processing between user avatars M1 other than the user avatars M1 in the seated state (for example, dialog processing between a seated user avatar M1 and a movement-enabled user avatar M1, and a dialog processing between movement-enabled user avatars M1) in different manners. For example, in the case of dialog processing between seated user avatars M1, the dialog processor 160 may increase the output level of vocal sounds and/or decrease the output level of ambient sounds (volume of the outside world) compared to the case of dialog processing between user avatars M1 other than the user avatars M1 in the seated state. This can make it easier for the user to concentrate on the dialog in the seated state of the user avatar M1. Alternatively, the dialog processor 160 may realize dialog processing only between the seated user avatars M1. Alternatively, the dialog processor 160 may realize voice dialog processing only between the user avatars M1 in the seated state, and may realize text-based dialog processing for dialog processing between other user avatars M1.

The invalidation processor 162 determines whether a predetermined seating invalidation condition (an example of a predetermined invalidation condition) is established, and invalidates the chair button 301 when the predetermined seating invalidation condition is established. The predetermined seating invalidation condition is arbitrary, but may be satisfied, for example, when the user avatar M1 is positioned in the above-mentioned seating prohibited area. In this case, the predetermined seating invalidation condition may be determined for each user avatar M1. Further, the predetermined seating invalidation condition may be determined based on the value of a seating parameter.

Invalidating the chair button 301 may be realized by not drawing the chair button 301 in cooperation with the user interface drawing portion 1582, or by drawing the chair button 301 in an inoperable manner. For example, in an inoperable display mode, the chair button 301 may be drawn with a significantly lower brightness (or a different color than normal) than in an operable display mode. In this case, the user can easily see whether the chair button 301 is active. If the user operates the chair button 301 that is drawn in the operable display manner, a seating instruction will be generated normally. If the user operates the chair button 301 that is drawn in the inoperable display mode, no seating instruction will be generated.

In a modified example, the invalidation processor 162 may invalidate a seating instruction from one user via the chair button 301 instead of invalidating the chair button 301. In this case, the seating instruction is invalidated even if it is generated. For example, the seating instruction is not generated by the operation input acquisition portion 1521, or is not normally processed by the state switching portion 15220 of the user operation processor 1522.

Additionally, the invalidation processor 162 may determine whether a predetermined rising invalidation condition is established, and may invalidate the chair button 301 when the predetermined rising invalidation condition is established. The predetermined rising invalidation condition is arbitrary, but for example, may be satisfied in a situation in which content is being viewed simultaneously by a plurality of user avatars M1, and a user avatar M1 is seated at a position where the user avatar M1 can, by standing up, enter into the field of view of another user avatar M1 who views the content. Further, the predetermined rising invalidation condition may be determined based on the value of a seating parameter.

The parameter updating portion 170 updates respective values of the various camera parameters (see FIG. 4) of the virtual camera 60. As mentioned above, each value of the various camera parameters of the virtual camera 60 can differ for each terminal image (for each user avatar M1). Hereinafter, unless otherwise specified, a configuration for one user avatar M1 (one virtual camera 60) is described as representative.

In this embodiment, the parameter updating portion 170 includes a normal parameter calculator 1700, a seating parameter calculator 1701, a viewpoint switching portion 1702, and a transition parameter calculator 1703.

The normal parameter calculator 1700 functions when one user avatar M1 is in a movement-enabled state. The normal parameter calculator 1700 calculates each value of the various camera parameters of the virtual camera 60 for the one user avatar M1, based on the position/orientation information of the one user avatar M1. The normal parameter calculator 1700 calculates each value of the various camera parameters of the virtual camera 60 so that the third-person viewpoint mode of the above-described terminal image generator 158 is realized.

Figure 12:
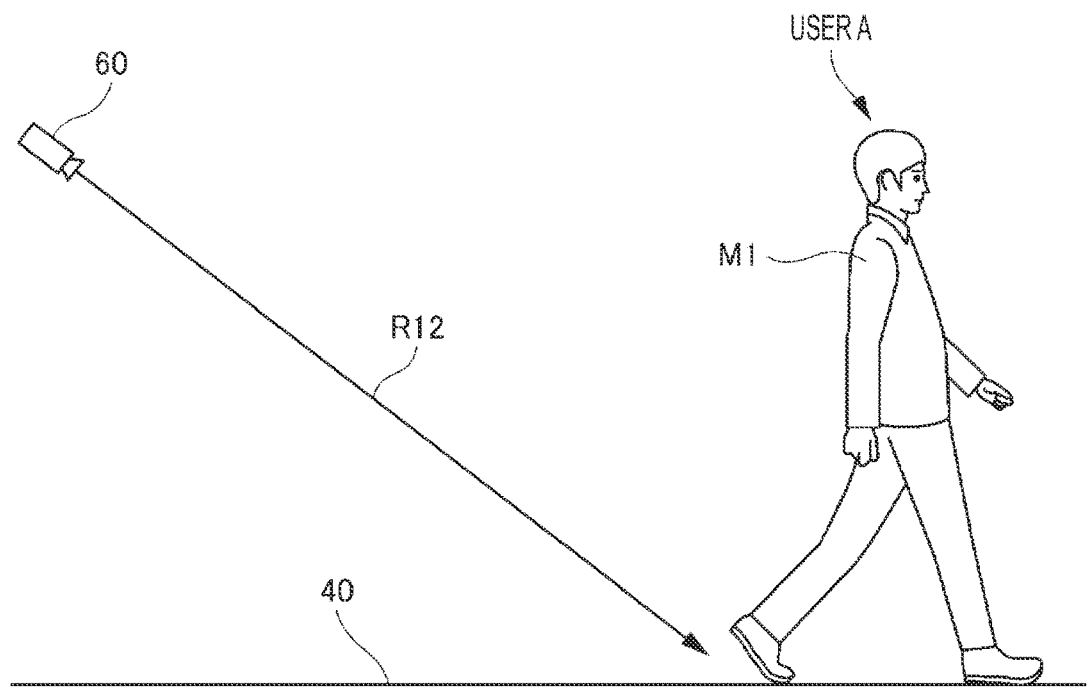
FIG. 12 is an explanatory view of an example of a method of calculating each value of various camera parameters of the virtual camera by a normal parameter calculator.

FIG. 12 is an explanatory view of an example of a method of calculating respective values of various camera parameters of the virtual camera 60 by the normal parameter calculator 1700. FIG. 12 schematically shows a side view of (i) one user avatar M1 (user avatar M1 pertaining to the user name "User A") in a movement-enabled state in the virtual space and (ii) the virtual camera 60. An arrow R12 from the virtual camera 60 corresponds to a viewing direction V shown in FIG. 4. When using the various camera parameters shown in FIG. 4, the normal parameter calculator 1700 may associate position parameters (X, Y) with a position of the user avatar M1 (x, y), based on the position/orientation information pertaining to a representative point of the user avatar M1. Additionally, the normal parameter calculator 1700 may associate the orientation parameter θ with the orientation (front direction) of the user avatar M1, based on the position/orientation information pertaining to the representative point of the user avatar M1. Additionally, the distance parameter A2 and the angle-of-attack parameter ψ may be fixed at respective values such that the entire user avatar M1 is drawn in the terminal image. Furthermore, each value of the distance parameter A2 and the angle-of-attack parameter ψ may be adjustable by the user.

The normal parameter calculator 1700 may calculate each value of various camera parameters of the virtual camera 60 without considering the position/orientation information pertaining to the parts of one user avatar M1. This is because when the user avatar M1 is in a movement-enabled state, the position/orientation information pertaining to the parts of the user avatar M1 is less important than when the user avatar M1 is in a seated state. In particular, in a situation in which the user pertaining to one user avatar M1 is inputting a movement operation, the movement state in which the one user avatar M1 is moving may be drawn, based only on the position/orientation information pertaining to the representative point of the one user avatar M1. This can efficiently reduce the load on the drawing process without significantly lowering the amount of information in the terminal image.

However, in a situation in which the user pertaining to one user avatar M1 does not perform any movement operation input (that is, in a situation in which the user avatar is stationary) or the movement speed is relatively low, the normal parameter calculator 1700 may calculate each value of the various camera parameters of the virtual camera 60 pertaining to the one user avatar M1, based on the parts-oriented operation input (particularly the parts-oriented operation input for the face part) pertaining to the one user avatar M1 by the user. For example, the normal parameter calculator 1700 may calculate the value of the orientation parameter θ shown in FIG. 4, based on the parts-oriented operation input (particularly the parts-oriented operation input for the face part) pertaining to one user avatar M1, to achieve the viewpoint of the virtual camera 60 in accordance with the face orientation and the like of the user avatar M1. This makes it easier, for example, for the user to observe the virtual space or find a desired route, based on the terminal image that changes as the user avatar M1 looks around in a movement-enabled state.

The seating parameter calculator 1701 functions when one user avatar M1 is in the seated state. The seating parameter calculator 1701 calculates each value of various camera parameters of the virtual camera 60 so that the first-person viewpoint mode of the above-described terminal image generation portion 158 is realized.

Figure 13:
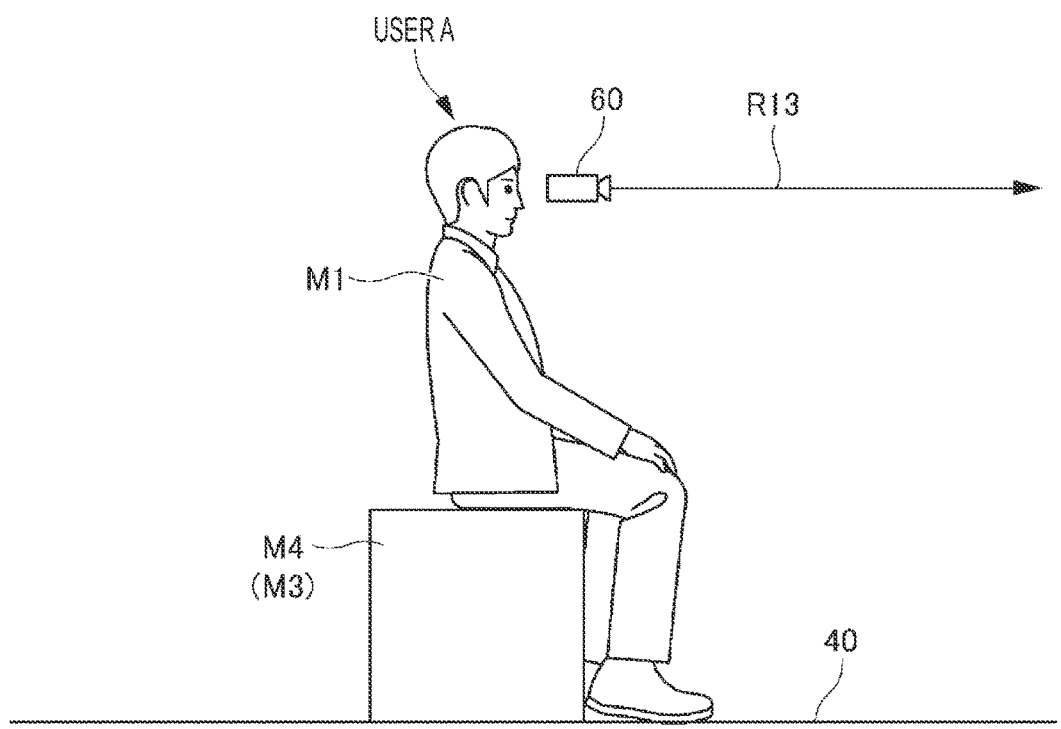
FIG. 13 is an explanatory view of an example of a method of calculating each value of various camera parameters of the virtual camera by a seating parameter calculator.

FIG. 13 is an explanatory view of an example of a method of calculating respective values of various camera parameters of the virtual camera 60 by the seating parameter calculator 1701. FIG. 13 schematically shows one user avatar M1 (user avatar M1 pertaining to the user name "User A") in a seated state in the virtual space and the virtual camera 60 in a side view. An arrow R13 from the virtual camera 60 corresponds to the viewing direction V shown in FIG. 4. As schematically shown in FIG. 13, the seating parameter calculator 1701 may calculate each value of the various camera parameters of the virtual camera 60, so that the viewpoint of the virtual camera 60 corresponds to the viewpoint of the one user avatar M1.

Specifically, when the various camera parameters shown in FIG. 4 are used, the seating parameter calculator 1701 may calculate the position parameters (X, Y), the distance parameter A2, and the angle-of-attack parameter ψ of the virtual camera 60 such that the virtual camera 60 is positioned in front of one user avatar M1 (for example, in front of the eyes), based on the position/orientation information pertaining to the representative point of the user avatar M1. Furthermore, the seating parameter calculator 1701 may calculate the value of the orientation parameter θ corresponding to the orientation of one user avatar M1, based on the position/orientation information pertaining to the representative point of the user avatar M1.

In contrast to the case of the normal parameter calculator 1700, the seating parameter calculator 1701 may calculate each value of various camera parameters of the virtual camera 60 pertaining to one user avatar M1 preferably based on the position/orientation information pertaining to the parts of the one user avatar M1. That is, the seating parameter calculator 1701 may calculate each value of the various camera parameters of the virtual camera 60 pertaining to the one user avatar M1, based on parts-oriented operation input (particularly the parts-oriented input of the face part) pertaining to the one user avatar M1. Thereby, in the seated state of the user avatar M1, the user may, for example, interact with a plurality of friend avatars, based on a terminal image that can appropriately selectively display a plurality of friend avatars in front of the user avatar M1.

In a modified example, the seating parameter calculator 1701 may position the position of the virtual camera 60 in front of one user avatar M1 (for example, in front of the eyes) and then use the rotation angles around the x1 axis, the y1 axis, and the z1 axis in the local coordinate system as shown in FIG. 9 as various camera parameters of the virtual camera 60. In this case, the seating parameter calculator

Figure 14:
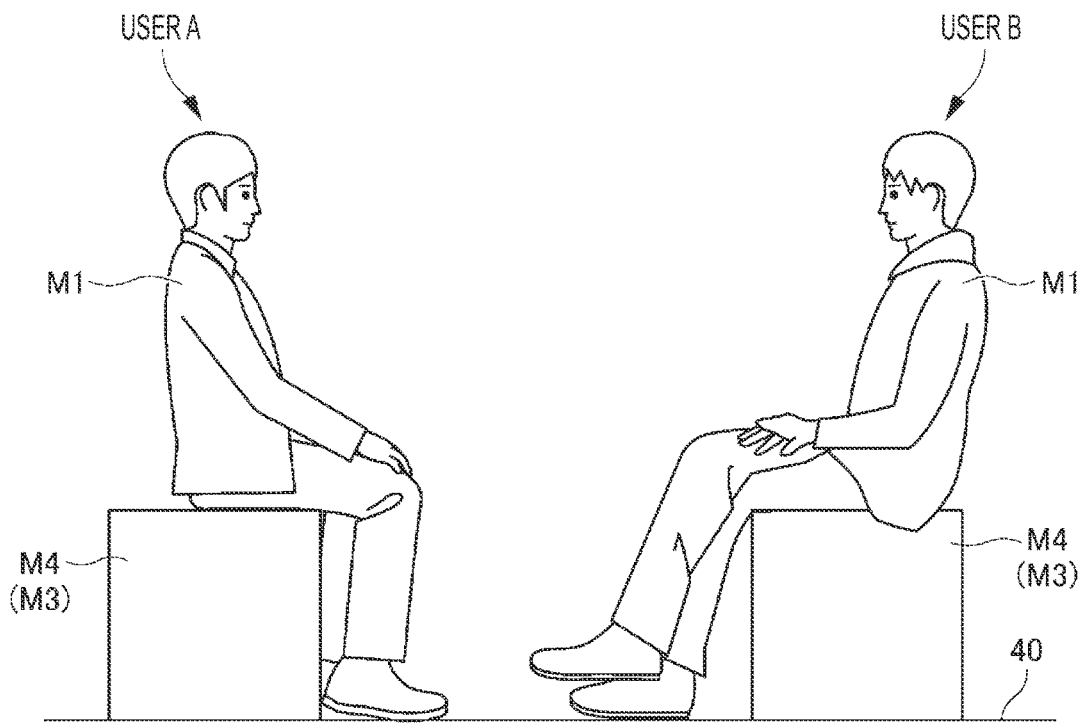
FIG. 14 is an explanatory view of a case in which a front direction is set based on the user avatar of a dialog partner.

1701 may calculate each value of various camera parameters of the virtual camera 60 pertaining to one user avatar M1, based on parts-oriented operation input (particularly the parts-oriented operation input of the face part) pertaining to the one user avatar M1. In this case, the local coordinate system may be set with the orientation indicated by the position/orientation information pertaining to the representative point of the user avatar M1 as the front orientation. Alternatively, as shown in FIG. 14, when the user avatar M1 of the dialog partner (in FIG. 14, the user avatar M1 of the user name "User B") is specified, the local coordinate system may be set with the direction toward the user avatar M1 of the dialog partner as the front direction.

Regarding the viewpoint (relative viewpoint described above) of the virtual camera 60 related to the terminal image for the user of one user avatar M1, switching is performed by the viewpoint switching portion 1702 between a viewpoint related to the first-person viewpoint mode (an example of the second viewpoint) and a viewpoint related to the third-person viewpoint mode (an example of the first viewpoint).

That is, the viewpoint switching portion 1702 updates each value of various camera parameters of the virtual camera 60, based on either the normal parameter calculator 1700 or the seating parameter calculator 1701. Specifically, the viewpoint switching portion 1702 updates each value of the various camera parameters of the virtual camera 60 based on the normal parameter calculator 1700, when one user avatar M1 is in a movement-enabled state. Additionally, the viewpoint switching portion 1702 updates each value of the various camera parameters of the virtual camera 60 based on the seating parameter calculator 1701, when one user avatar M1 is in the seated state.

When switching is performed between the viewpoint related to the third-person viewpoint mode and the viewpoint related to the first-person viewpoint mode (hereinafter, also referred to as "viewpoint switching") by the viewpoint switching portion 1702, the transition parameter calculator 1703 temporarily functions in place of the viewpoint switching portion 1702. That is, the transition parameter calculator 1703 functions when the state of the user avatar M1 is the transition state. The transition parameter calculator 1703 calculates and updates respective values of various camera parameters of the virtual camera 60 in the above-mentioned transition state to suppress sudden changes in the respective values of various camera parameters of the virtual camera 60 due to viewpoint switching by the viewpoint switching portion 1702.

For example, when the above-mentioned seating instruction is generated, the transition parameter calculator 1703 updates respective values of various camera parameters of the virtual camera 60 in a manner that gradually changes over a predetermined time from the respective values of various camera parameters of the virtual camera 60 calculated by the normal parameter calculator 1700 to the respective values of various camera parameters of the virtual camera 60 calculated by the seating parameter calculator 1701. The predetermined time (that is, the time pertaining to the transition state) may be adapted to a length that does not cause a feeling that something is wrong due to a sudden change. The animation by the seating movement drawing portion 15801 described above is realized based on respective values of various camera parameters of the virtual camera 60 updated by the transition parameter calculator 1703. In this case, when the respective values of the various camera parameters of the virtual camera 60 match the respective values of the various camera parameters of the virtual camera 60 calculated by the seating parameter calculator 1701, the transition state ends, and the seated state starts. That is, the respective values of the various camera parameters of the virtual camera 60 are completely transferred to the updated state (first-person viewpoint mode pertaining to the seated state), based on the calculation result of the seating parameter calculator 1701 by the viewpoint switching portion 1702.

Similarly, when the above-mentioned release instruction is generated, the transition parameter calculator 1703 updates respective values of various camera parameters of the virtual camera 60 in a manner that gradually changes over a predetermined time from the respective values of various camera parameters of the virtual camera 60 calculated by the seating parameter calculator 1701 to the respective values of various camera parameters of the virtual camera 60 calculated by the normal parameter calculator 1700. Additionally, the animation by the rising movement drawing portion 15802 described above is realized based on the respective values of the various camera parameters of the virtual camera 60 updated by the transition parameter calculator 1703. In this case, when the respective values of the various camera parameters of the virtual camera 60 match the respective values of the various camera parameters of the virtual camera 60 calculated by the normal parameter calculator 1700, the transition state ends, and the movement-enabled state starts. That is, the respective values of the various camera parameters of the virtual camera 60 are completely transferred to the updated state (third-person viewpoint mode pertaining to the movement-enabled state) by the viewpoint switching portion 1702 based on the calculation result of the normal parameter calculator 1700.

Figure 15:
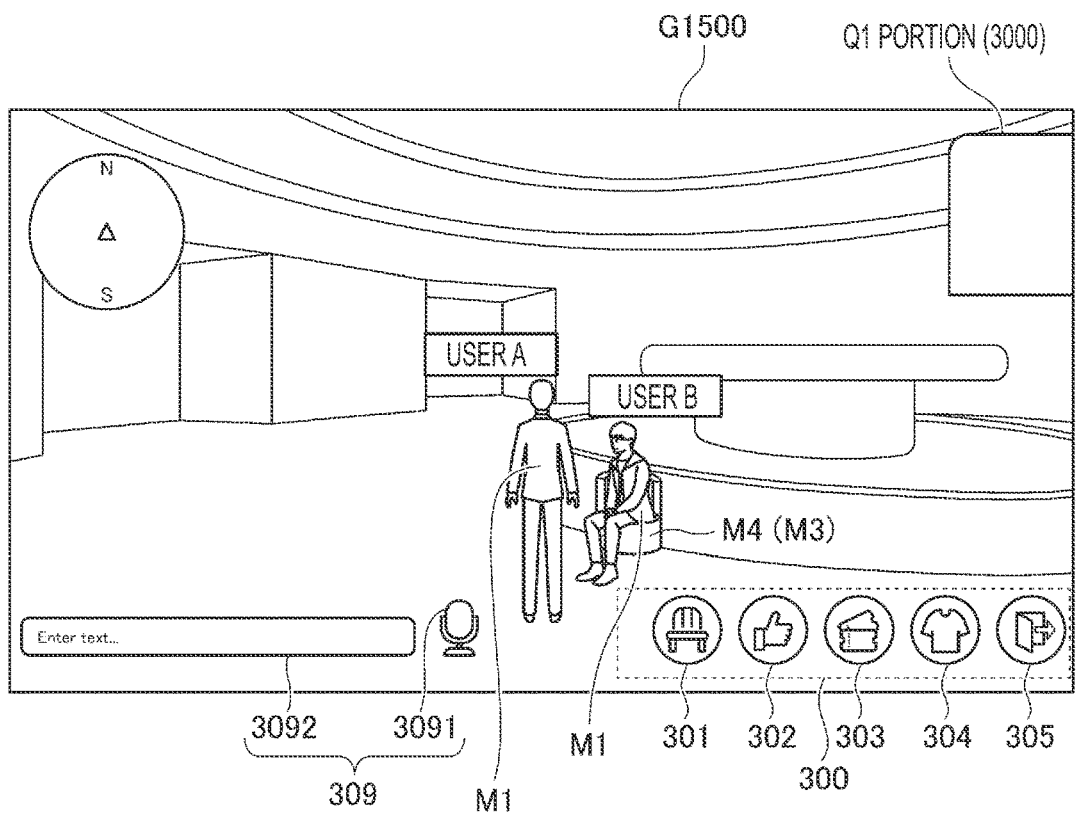
FIG. 15 is an explanatory view of a terminal image based on a viewpoint pertaining to a third-person viewpoint mode.
Figure 16:
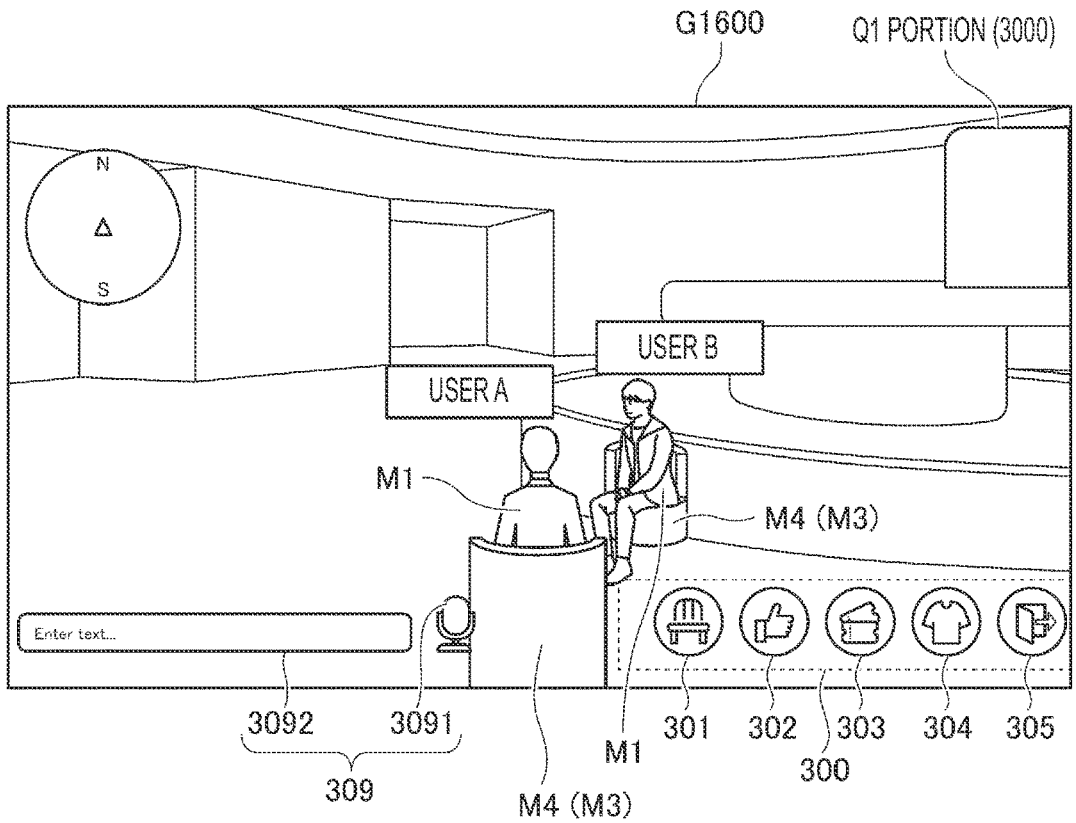
FIG. 16 is an explanatory view of a terminal image in a transition state based on a calculation result of the transition parameter calculator.
Figure 17:
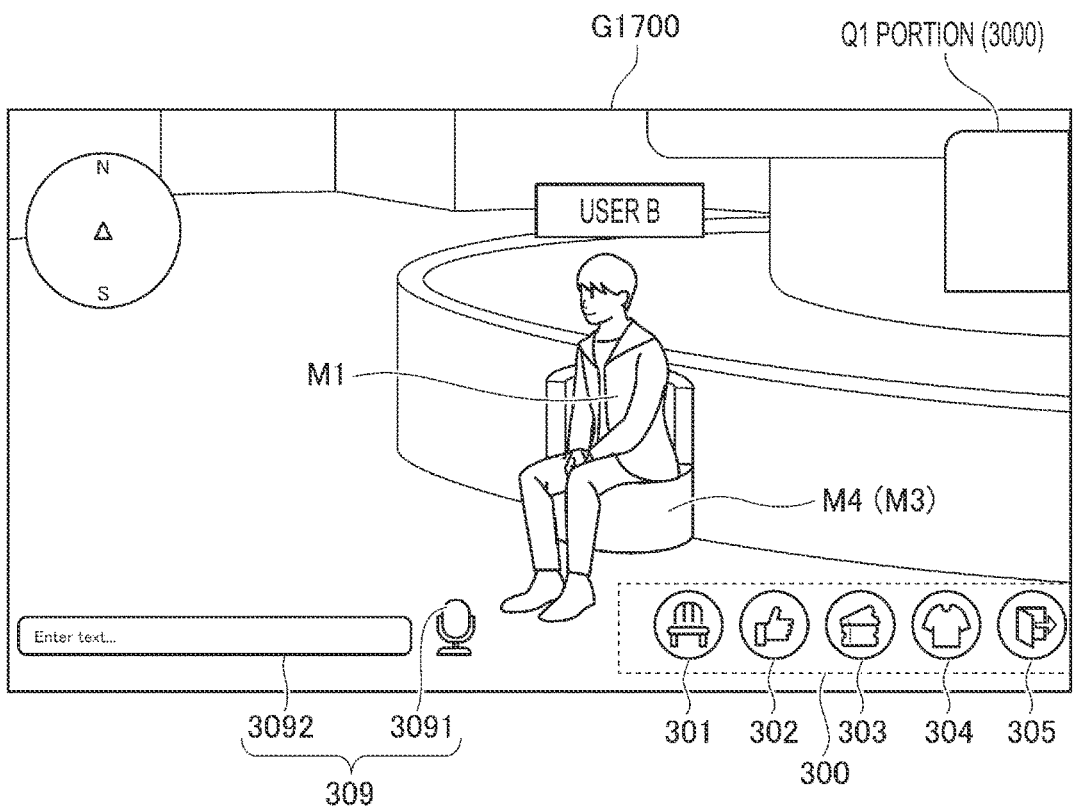
FIG. 17 is an explanatory view of a terminal image based on a viewpoint pertaining to a first-person viewpoint mode.

FIGS. 15-17 are explanatory views of functions of the transition parameter calculator 1703 and are diagrams showing examples of terminal images that are generated when switching is performed between a viewpoint pertaining to a third-person viewpoint mode and a viewpoint pertaining to a first-person viewpoint mode.

FIG. 15 shows a terminal image G1500 that is based on a viewpoint pertaining to the third-person viewpoint mode. FIG. 16 shows a terminal image G1600 in the transition state that is based on the calculation result by the transition parameter calculator 1703. FIG. 17 shows a terminal image G1700 that is based on a viewpoint pertaining to the first-person viewpoint mode. FIGS. 15 to 17 are terminal images for a user pertaining to the user avatar M1 associated with the user name "User A."

In the example shown in FIGS. 15 to 17, the user pertaining to the user avatar M1 associated with the user name "User A" operates the chair button 301 to sit down at the position of the user avatar M1 shown in FIG. 15. As a result, the transition parameter calculator 1703, and accordingly, the seating movement drawing portion 15801 function, and the terminal image G1700 shown in FIG. 17 is generated via the terminal image G1600 shown in FIG. 16. In this transition state, the positions and orientations of the user avatars M1 as a whole have not substantially changed, but by switching to the first-person viewpoint mode, the user avatar M1 of the dialog partner (here, the user avatar M1 of the user name "User B") is drawn large in the terminal image G1700, and it becomes easier to understand the movement and the like of the user avatar M1 of the dialog partner. As a result, for example, it becomes possible to thoroughly enjoy the dialog with the dialog partner, and the like, and effective dialog between the users via the dialog can be expected. Furthermore, in the first-person viewpoint mode, the user avatar M1 of the dialog partner (here, the user avatar M1 of the user name "User B") is drawn large, so that even on a relatively small screen (for example, the screen of a smartphone), the movement and the like of the user avatar M1 of the dialog partner can easily be understood. This also allows for effective dialog between the users via dialog. In addition, in the first-person viewpoint mode, the user avatar M1 itself does not need to be drawn, so a reduction in the load on the drawing process can be expected. In the example shown in FIGS. 15 to 17, a specific object M4 appears at the start of the transition state (see FIG. 16), and at the end of the transition state, the specific object M4 is out of the field of view of the virtual camera 60 for the seated user avatar M1 (user avatar M1 with user name "User A").

Next, with reference to FIGS. 18 to 19, an example of an operation of the virtual reality generation system 1 will be explained. In the subsequent processing flowchart, the processing order of each step may be changed as long as the relationship between the input and output of each step is not compromised.

Figure 18:
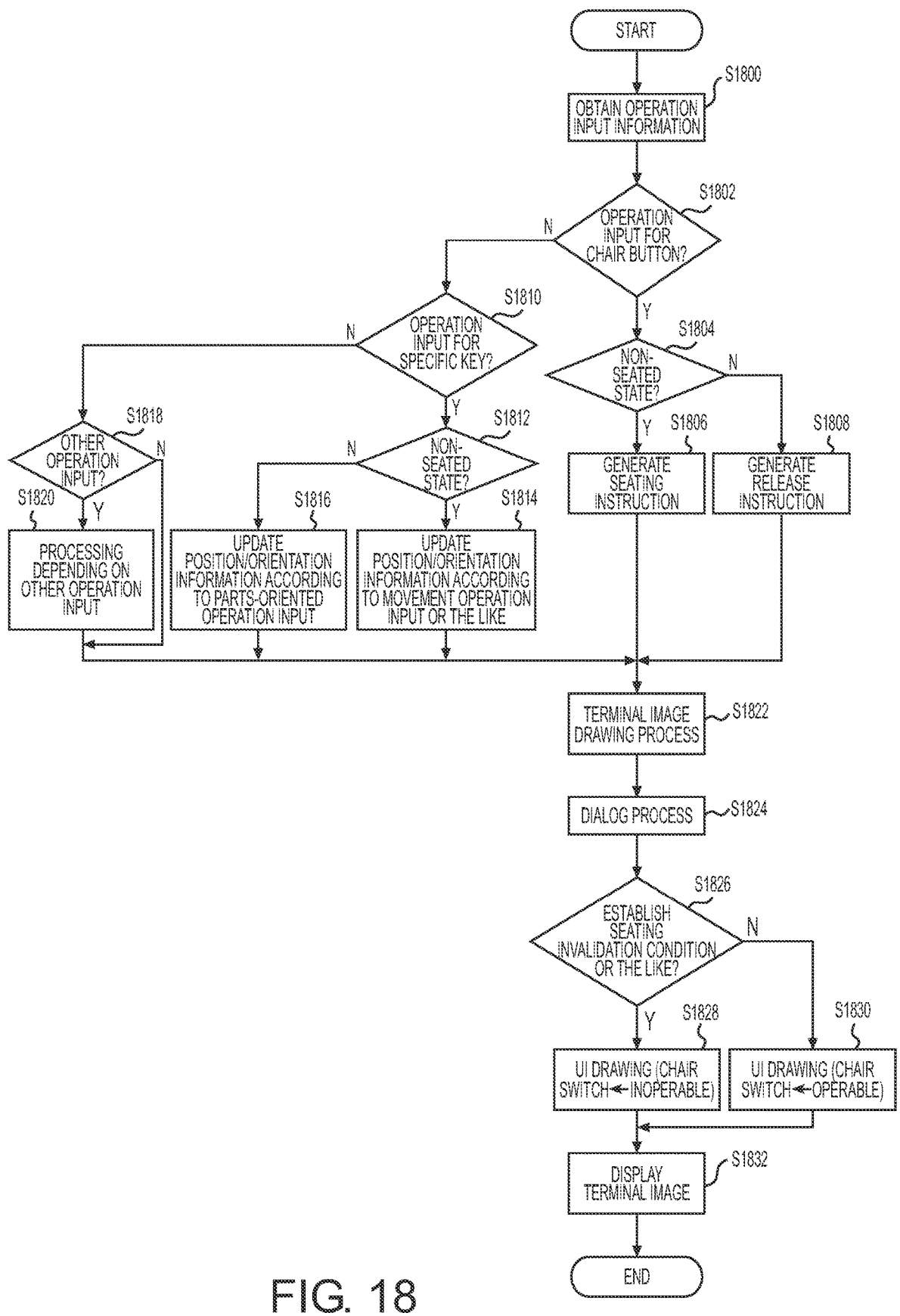
FIG. 18 is a schematic flowchart showing an example of an operation related to the dialog promotion function.

FIG. 18 is a schematic flowchart showing an example of an operation related to the dialog promotion function. The process shown in FIG. 18 shows a process for a certain one user and may be started when the virtual reality application in the terminal device 20 related to one user is started, and may be repeatedly executed at predetermined intervals until the virtual reality application is turned off. The process shown in FIG. 18 may be executed in parallel for each user.

In step S1800, the server device 10 acquires operation input information pertaining to the user.

In step S1802, the server device 10 determines whether operation input of the chair button 301 is included in the operation input information acquired in step S1800. If the determination result is "YES", the process proceeds to step S1804, and if not, the process proceeds to step S1810.

In step S1804, the server device 10 determines whether the state of the user avatar M1 is a non-seated state. If the determination result is "YES", the process proceeds to step S1806, and if not, the process proceeds to step S1808.

In step S1806, the server device 10 generates a seating instruction, based on the operation input information (operation input of the chair button 301) acquired in step S1800.

In step S1808, the server device 10 generates a release instruction, based on the operation input information (operation input of the chair button 301) acquired in step S1800.

In step S1810, the server device 10 determines whether the operation input information acquired in step S1800 includes the operation input of a specific key (for example, the "WASD" keys). If the determination result is "YES", the process proceeds to step S1812, and if not, the process proceeds to step S1818.

In step S1812, the server device 10 determines whether the user avatar M1 is in a non-seated state. If the determination result is "YES," the process proceeds to step S1814. If not, the process proceeds to step S1816.

In step S1814, the server device 10 handles the operation input of the specific key included in the operation input information acquired in step S1800 as a movement operation input or an overall orientation operation input, thereby updating the position/orientation information of the user avatar M1, based on the movement operation input or the overall orientation operation input.

In step S1816, the server device 10 handles the operation input of the specific key included in the operation input information acquired in step S1800 as a parts-oriented operation input, thereby updating the position/orientation information of the user avatar M1, based on the parts-oriented operation input.

In step S1818, the server device 10 determines whether the operation input information acquired in step S1800 includes another operation input. If the determination result is "YES", the process proceeds to step S1820, and if not, the process proceeds to step S1822.

In step S1820, the server device 10 performs a process according to another operation input. The other operation input is arbitrary, and the process corresponding to the other operation input is also arbitrary. For example, the other operation input may be an operation input for causing the user avatar M1 to jump. In this case, the process corresponding to the other operation input may be a process of updating the position/orientation information of the user avatar M1 so that the jump operation of the user avatar M1 is reflected in the image drawing process for the terminal in the next step S1822.

In step S1822, the server device 10 executes a terminal image drawing process for drawing a portion, other than the portion related to the user interface, of the above-mentioned terminal image, based on the processing results of steps S1800 to S1820. An example of the terminal image drawing process will be described later with reference to FIG. 19.

In step S1824, the server device 10 performs a dialog process, based on the dialog input that can be included in the operation input information acquired in step S1800. In a processing cycle in which the operation input information acquired in step S1800 does not include the input for dialog, step S1824 may be skipped.

In step S1826, the server device 10 determines whether a predetermined seating invalidation condition or a predetermined rising invalidation condition is established. The predetermined seating invalidation condition or the predetermined rising invalidation condition is as described above. If either the predetermined seating invalidation condition or the predetermined rising invalidation condition is satisfied, the process proceeds to step S1828, and if neither the predetermined seating invalidation condition nor the predetermined rising invalidation condition is satisfied, the process proceeds to step S1830.

In step S1828, the server device 10 draws a user interface (see the main interface 300 and the dialog interface 309 of FIG. 3). At this time, the server device 10 draws the chair button 301 in an inoperable manner.

In step S1830, the server device 10 draws a user interface (see the main interface 300 and the dialog interface 309 of FIG. 3). At this time, the server device 10 draws the chair button 301 in an operable manner.

In step S1832, the server device 10 causes the terminal device 20 related to the user to display the terminal image thus drawn.

Figure 19:
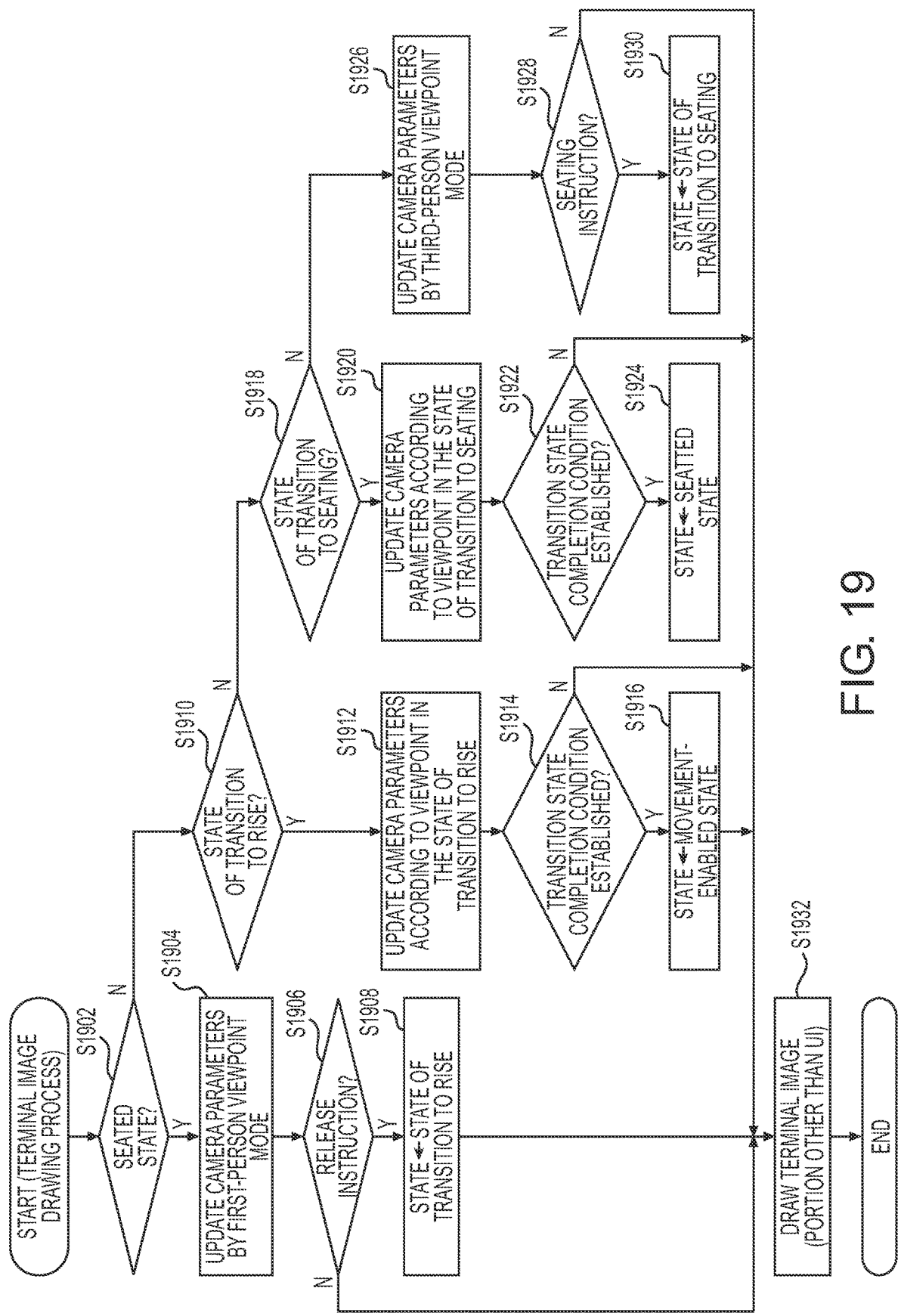
FIG. 19 is a schematic flowchart showing an example of a terminal image drawing process (step S1822 of FIG. 18).

FIG. 19 is a schematic flowchart showing an example of a terminal image drawing process (step S1822 of FIG. 18).

In step S1902, the server device 10 determines whether the user avatar M1 is in the seated state, based on the avatar information 700 (see FIG. 7). If the determination result is "YES", the process proceeds to step S1904, and if not, the process proceeds to step S1910.

In step S1904, the server device 10 updates each value of the various camera parameters, based on the viewpoint related to the first-person viewpoint mode (calculation result by the seating parameter calculator 1701 described above). The various camera parameters are as described above with reference to FIG. 4.

In step S1906, the server device 10 determines whether a release instruction has been generated. The release instruction is generated in step S1808 of FIG. 18 described above.

If the determination result is "YES", the process proceeds to step S1908, and if not, the process proceeds to step S1932.

In step S1908, the server device 10 sets the state of the user avatar M1 to the "transition state" to the rising, and updates the avatar information 700 (see FIG. 7).

In step S1910, the server device 10 determines whether the state of the user avatar M1 is the "transition state" to the rising, based on the avatar information 700 (see FIG. 7). If the determination result is "YES", the process proceeds to step S1912, and if not, the process proceeds to step S1918.

In step S1912, the server device 10 updates each value of the various camera parameters, based on the viewpoint in the "transition state" to the rising (calculation result by the transition parameter calculator 1703 described above). The various camera parameters are as described above with reference to FIG. 4.

In step S1914, the server device 10 determines whether the end condition of the "transition state" to the rising is established. The end condition of the "transition state" to the rising is satisfied when each value of the various camera parameters matches the viewpoint related to the third-person viewpoint mode (calculation result by the normal parameter calculator 1700 described above). If the determination result is "YES", the process proceeds to step S1916, and if not, the process proceeds to step S1932.

In step S1916, the server device 10 sets the state of the user avatar M1 to the "movement-enabled state" and updates the avatar information 700 (see FIG. 7).

In step S1918, the server device 10 determines whether the state of the user avatar M1 is the "transition state" to seating, based on the avatar information 700 (see FIG. 7). If the determination result is "YES", the process proceeds to step S1920, and if not (that is, when the user avatar M1 is in the movement-enabled state), the process proceeds to step S1926.

In step S1920, the server device 10 updates each value of the various camera parameters, based on the viewpoint in the "transition state" to seating (calculation result by the transition parameter calculator 1703 described above). The various camera parameters are as described above with reference to FIG. 4.

In step S1922, the server device 10 determines whether the end condition of the "transition state" to seating is established. The end condition of the "transition state" to seating is satisfied when each value of the various camera parameters matches the viewpoint related to the first-person viewpoint mode. If the determination result is "YES", the process proceeds to step S1924, and if not, the process proceeds to step S1932.

In step S1924, the server device 10 sets the state of the user avatar M1 to the "seated state" and updates the avatar information 700 (see FIG. 7).

In step S1926, the server device 10 updates each value of various camera parameters, based on the viewpoint related to the third-person viewpoint mode (calculation result by the normal parameter calculator 1700 described above). The various camera parameters are as described above with reference to FIG. 4.

In step S1928, the server device 10 determines whether a seating instruction has been generated. The seating instruction is generated in step S1806 of FIG. 18, as described above. If the determination result is "YES," the process proceeds to step S1930, and if not, the process proceeds to step S1932.

In step S1930, the server device 10 sets the state of the user avatar M1 to the "transition state" to seating, and updates the avatar information 700 (see FIG. 7).

In step S1932, the server device 10 draws a portion, other than the portion related to the user interface, of the above-mentioned terminal image, based on each value of the various camera parameters updated in the above-described manner.

Thus, according to the processes shown in FIGS. 18 and 19, the viewpoint of the virtual camera 60 associated with one user avatar M1 is set according to various states of the user avatar M1. By so doing, a terminal image can be generated that effectively supports various activities of the user in the virtual space via the user avatar M1 (for example, dialog with a user related to another user avatar M1).

Incidentally, in the above-described embodiment with reference to FIGS. 5 to 19, the server device 10 comprehensively realizes various functions, but some or all of the various functions of the above-mentioned server device 10 can also be realized by the terminal device 20 instead of the server device 10. Hereinafter, as an example, a configuration will be described in which some of the various functions of the server device 10 are realized by the terminal device 20.

Figure 20:
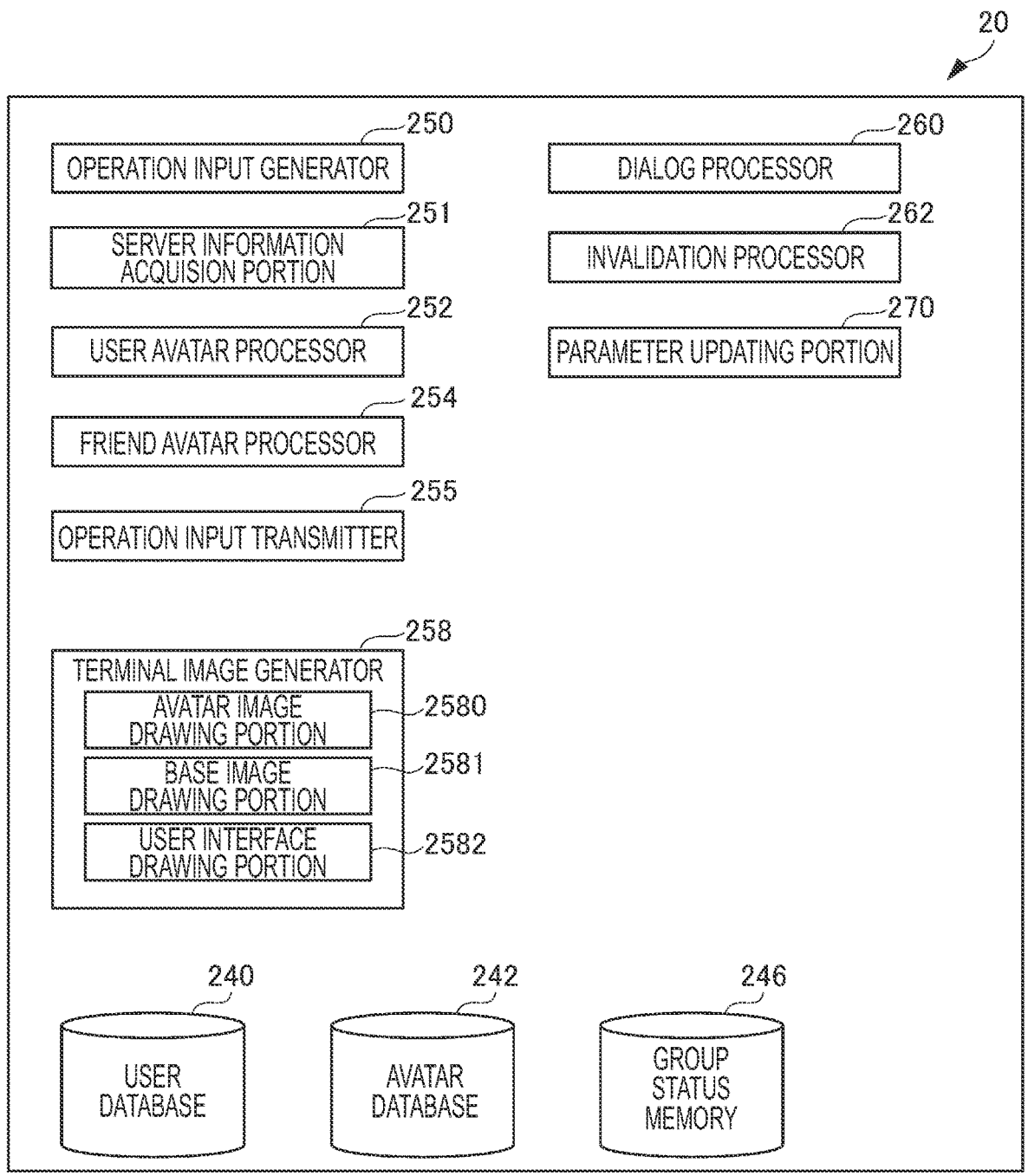
FIG. 20 is an example of a functional block diagram of a terminal device related to an avatar movement guidance function.

FIG. 20 is an example of a functional block diagram of the terminal device 20 related to an avatar movement guidance function. Hereinafter, one terminal device 20 will be described as representative, and the user refers to a user related to the terminal device 20 unless otherwise specified.

In the example shown in FIG. 20, the terminal device 20 includes a user database 240, an avatar database 242, a group status memory 246, an operation input generator 250, a server information acquisition portion 251, a user avatar processor 252 (an example of an acquisition portion and an example of a position changing portion), a friend avatar processor 254, an operation input transmitter 255, a terminal image generator 258, a dialog processor 260 (an example of an output portion), an invalidation processor 262, and a parameter update portion 270.

The devices from the user database 240 to the group status memory 246 can be realized by the terminal memory 22 shown in FIG. 1. The devices from the operation input generator 250 to the parameter update portion 270 can be realized by the terminal controller 25 shown in FIG. 1. Further, among the devices from the operation input generator 250 to the parameter update portion 270, part of these devices (the functional portion(s) that communicate(s) with the server device 10) can be realized by the terminal communicator 21 together with the terminal controller 25 shown in FIG. 1.

The various data stored in each of the devices from the user database 240 to the group status memory 246 may be substantially the same as the various data stored in each of the devices from the user database 140 to the group status memory 146 of the server device 10 described above. However, the various data stored in the user database 240 may be only data related to the user and his friend user (user related to friend avatar in the same group, the same applies hereinafter), among the data stored in the user database 140 of the server device 10 described above. This also applies to the group status memory 246.

The operation input generator 250 generates the above-mentioned operation input information, based on various inputs from the user (various inputs via the input portion 24). Furthermore, the various inputs from the user are as described above, and may include movement operation input by operation of a specific key or the like, overall orientation operation input, parts-oriented operation input, dialog input, operation input of the chair button 301, and the like.

Figure 21:
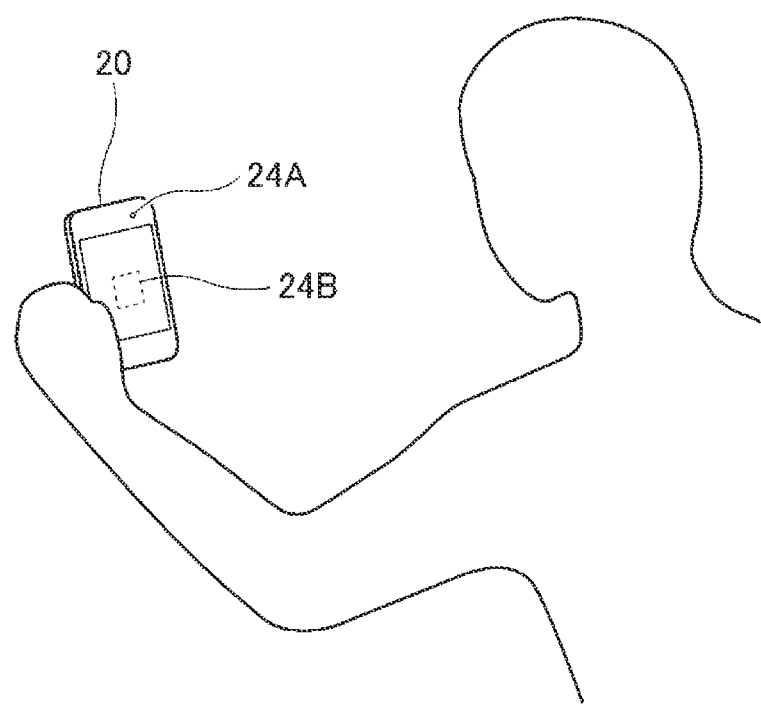
FIG. 21 is an explanatory view of parts-oriented operation input by gestures.

As described above, the parts-oriented operation input may be realized by gestures or the like. For example, FIG. 21 is an explanatory view of parts-oriented operation input by a gesture. FIG. 21 shows a state in which a user performs parts-oriented operation input by changing the orientation of the face while holding the terminal device 20 by hand. In this case, the terminal device 20 identifies the user's face based on the user's face image input via a terminal camera 24A (an example of the input portion 24), and generates operation input information including parts-oriented operation input according to the orientation of the identified face. Alternatively, the user may change the orientation of the terminal device 20 while holding the terminal device 20 by hand. In this case, the terminal device 20 may generate operation input information including parts-oriented operation input according to the orientation of the terminal device 20 based on an acceleration sensor 24B installed in the terminal device 20.

From the server device 10, the server information acquisition portion 251 acquires various data stored in each of the devices from the user database 240 to the group status memory 246. The data acquisition timing by the server information acquisition portion 251 is arbitrary, but may be at the time of updating the virtual reality application or the like. However, the acquisition (update) timing of the data stored in the group status memory 246 may be when the users constituting the group change. Thus, various data stored in each of the devices from the user database 240 to the group status memory 246 may be appropriately updated based on the data acquired by the server information acquisition portion 251.

The user avatar processor 252 has substantially the same function as the user avatar processor 152 of the server device 10 described above. However, the user avatar M1 to be processed by the user avatar processor 252 may be only the user avatar M1 associated with the user related to the terminal device 20.

The friend avatar processor 254 has substantially the same function as the user avatar processor 152 of the server device 10 described above. However, the user avatar M1 to be processed by the friend avatar processor 254 may be only a friend avatar for the user avatar M1 associated with the user related to the terminal device 20.

The user avatar processor 252 and the friend avatar processor 254, respectively, realize various processes such as a movement process that is based on the movement operation input for the user avatar M1 to be processed, similarly to the user avatar processor 152 of the server device 10 described above. The user avatar processor 252 may perform various processes based on the operation input information related to the user, and the friend avatar processor 254 may perform various processes based on the operation input information related to the friend user. As a result, the position/orientation information of each user avatar M1 is updated.

The operation input transmitter 255 transmits, to the server device 10, the operation input information generated by the operation input generator 250. Additionally, instead of the operation input information, the operation input transmitter 255 may transmit, to the server device 10, the position/orientation information of the user avatar M1 updated based on the operation input information by the user avatar processor 252. Further, the operation input transmitter 255 may transmit the operation input information to the server device 10 only when another user avatar M1 (friend avatar) exists in the virtual space in which the user avatar M1 related to the user is active.

The terminal image generator 258 generates a terminal image for the terminal device 20. The terminal image may be as described above. In this case, for example, the terminal image generator 258 may draw an image of each friend avatar, based on (i) the position/orientation information of the friend avatar(s) acquired or generated by the friend avatar processor 254, (ii) information that can identify the friend avatar(s) to be drawn (for example, a user avatar ID), and (iii) the avatar information 700 related to the friend avatar(s) to be drawn (see FIG. 7). In this case, the terminal device 20 stores, in the terminal memory 22 (avatar database 242), part information for drawing each part of the avatar, and the terminal device 20 may draw each friend avatar, based on (i) the part information and (ii) the position/orientation information and the like of the friend avatar acquired from the server device 10.

Specifically, the terminal image generator 258 includes an avatar image drawing portion 2580, a base image drawing portion 2581, and a user interface drawing portion 2582. Each of the avatar image drawing portion 2580, the base image drawing portion 2581, and the user interface drawing portion 2582 may be respectively the same as the avatar image drawing portion 1580, the base image drawing portion 1581, and the user interface drawing portion 1582 of the server device 10 described above. However, the terminal image to be drawn is only the terminal image for one terminal device 20.

The dialog processor 260 has substantially the same function as the dialog processor 160 of the server device 10 described above. The dialog processor 260 executes dialog processing related to the dialog between the users in the same group, based on each input for dialog from the user and his friend user(s).

The invalidation processor 262 has substantially the same function as the invalidation processor 162 of the server device 10 described above. However, the processing target of the invalidation processor 262 may be only the chair button 301 associated with the user related to the terminal device 20.

The parameter update portion 270 updates each value of the various parameters (see FIG. 4) of the virtual camera 60 associated with the user avatar M1.

Figure 22:
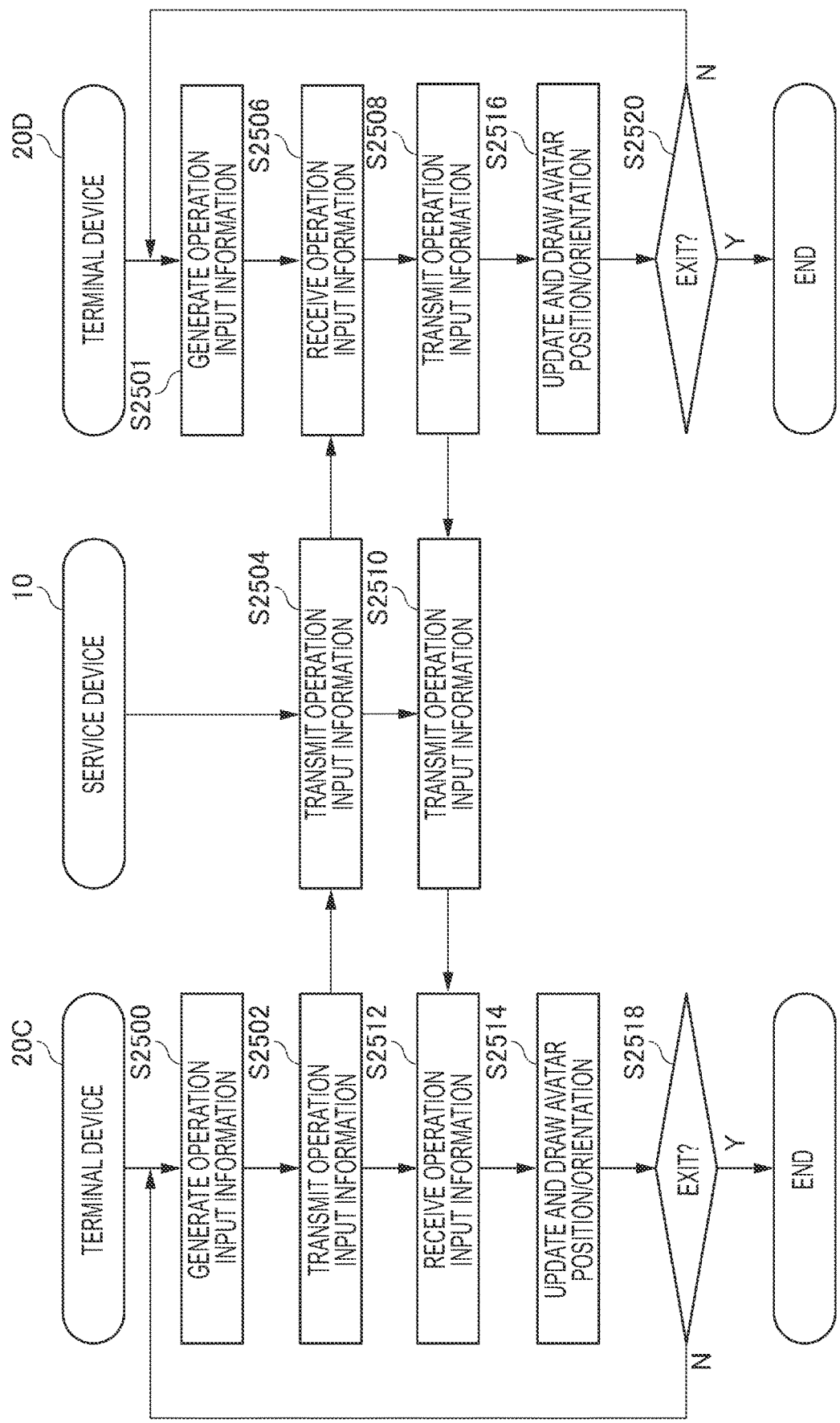
FIG. 22 is a schematic flowchart that is an example of operation by the terminal device shown in FIG. 20 and shows an example of operation related to a terminal image generator.

FIG. 22 is an operation example by the terminal device 20 shown in FIG. 20, and is a schematic flowchart showing an operation example related to the terminal image generator 258. In FIG. 22, a terminal device 20C shows the terminal device 20 shown in FIG. 20 relating to the user, and a terminal device 20D shows the terminal device 20 shown in FIG. 20 relating to the user associated with one friend avatar in the same group. Here, the number of users related to the terminal device 20D is one, but the same applies even if there are two or more users. That is, in this case, the terminal device 20C and each of the plurality of terminal devices 20D may form a set to realize the operation example shown in FIG. 22.

In each of the terminal device 20C and the terminal device 20D, operation input information is generated based on various inputs by the corresponding users (step S2500, step S2501), and the generated operation input information is transmitted to the server device 10 (step S2502, Step S2508). The server device 10 transfers the operation input information received from the terminal devices 20 (here, the terminal device 20C and the terminal device 20D) of each user in the same group (step S2504, step S2510). At this time, the server device 10 may transfer the operation input information as-is, or may perform predetermined processing or the like before transmitting the operation input information. For example, the operation input information may be transmitted after being converted into the position/orientation information of each user avatar M1. Thus, the operation input information (operation input information relating to the friend avatar) is received in each of the terminal device 20C and the terminal device 20D (step S2512, step S2506).

In the terminal device 20C, the position/orientation information of each user avatar M1 is updated based on the operation input information generated in step S2500 and the operation input information (operation input information related to the friend avatar) received in step S2512, and a terminal image is drawn (step S2514). Similarly, in the terminal device 20D, the position/orientation information of each user avatar M1 is updated based on the operation input information generated in step S2501 and the operation input information (operation input information related to the friend avatar) received in step S2506, and a terminal image is drawn (step S2516).

Such an operation is repeated in each of the terminal device 20C and the terminal device 20D until the corresponding user avatar M1 exits the virtual space ("YES" in step S2518, "YES" in step S2520).

Although undepicted in FIG. 22, in the above-mentioned dialog processing (dialog processing between the user avatars M1 in the same group) as well, voice input or the like generated in each of the terminal device 20C and the terminal device 20D may be realized by exchanging between the terminal device 20C and the terminal device 20D in the same manner as in the case of the above-mentioned operation input information.

Although an embodiment has been described in detail with reference to the drawings, the specific configuration is not limited to this embodiment, and includes designs and the like within a range that does not deviate from the scope of this disclosure.

For example, in the above-described embodiment, the state switching portion 15220 may forcibly switch the state of the user avatar M1 related to the one user from the non-seated state to the seated state regardless of whether there is a seating instruction related to the one user when a predetermined forced seating condition for the one user is established. In this case, the predetermined forced seating condition is arbitrary, but in a specification in which the seating area (for example, a space portion dedicated to dialog) is set in the virtual space, (i) when a non-seated state (for example, movement-enabled state) is maintained in the seated area for a predetermined time or longer, (ii) when a stationary state in which the user avatar M1 in the movement-enabled state does not move is maintained for a predetermined time or longer, (iii) when dialog in the movement-enabled state is maintained for a predetermined time or longer, or the like, the predetermined forced seating condition may be satisfied. Furthermore, the predetermined forced seating condition may be determined based on the value of the seating parameter described above. Additionally, a predetermined forced rising condition may be set in place of or in addition to the predetermined forced seating condition. In this case, the state switching portion 15220 may forcibly switch the state of the user avatar M1 related to the one user from the seated state to the non-seated state when the predetermined forced rising condition for the one user is established, regardless of the presence or absence of the release instruction related to the one user. In this case, the predetermined forced rising condition is arbitrary, but may be determined based on the value of the above-mentioned seating parameter in the same manner as the predetermined forced seating condition.

In the embodiment described above, a user to whom a plurality of specific object IDs (see FIG. 6) are associated may be able to specify the specific object M4 to seat the user avatar M1, together with or separately from the seating instruction.

Furthermore, in the above-described embodiment, a predetermined specific object M4 on which a plurality of user avatars M1 can be seated at the same time may be prepared. In this case, when (i) a seating instruction for a user associated with one user avatar M1 is generated, (ii) the one user avatar M1 is located in the vicinity of the predetermined specific object M4, and (iii) there is an empty space in the predetermined specific object M4, the seating state of the one user avatar M1 being seated on the predetermined specific object M4 may be realized.

Additionally, in the above-described embodiment, the difference between the first-person viewpoint mode and the third-person viewpoint mode is realized by calculating each value of various parameters of the virtual camera 60 in different modes, but the disclosure is not limited to this. For example, equivalently, the virtual camera 60 may realize the difference between the first-person viewpoint mode and the third-person viewpoint mode by differently using a plurality of types of cameras having different characteristics. For example, a virtual camera for the first-person viewpoint mode and a virtual camera for the third-person viewpoint mode are prepared. In this case, the virtual camera for the third-person viewpoint mode may be set to have a wider angle of view than the virtual camera for the first-person viewpoint mode. For example, a virtual camera for third-person viewpoint mode may have lens characteristics corresponding to a fisheye lens.

As used throughout this disclosure, the singular forms "a," "an," and "the" may refer to either singular or plural elements unless the context clearly dictates otherwise.

EXPLANATION OF SYMBOLS

1 Virtual reality generation system
3 Network
10 Server device
20 Terminal devices
60 Virtual camera
70 Space portions
71 Free space portion
140 User database
142 Avatar database
146 Group status memory
150 Group setting portion
152 User avatar processor
1521 Operation input acquisition portion
1522 User operation processor
15220 State switching portion
15221 Basic operation processor
158 Terminal image generator
1580 Avatar image drawing portion
15801 Seating movement drawing portion
15802 Rising movement drawing portion
1581 Base image drawing portion
1582 User interface drawing portion
1583 Speaker information drawing portion
160 Dialog processor
162 Invalidation processor
170 Parameter updating portion
1700 Normal parameter calculator
1701 Seating parameter calculator
1702 Viewpoint switching portion 1703 Transition parameter calculator
240 User database
242 Avatar database
246 Group status memory
250 Operation input generator
251 Server information acquisition portion
252 User avatar processor
254 Friend avatar processor
255 Operation input transmitter
258 Terminal image generator
2580 Avatar image drawing portion
2581 Base image drawing portion
2582 User interface drawing portion
260 Dialog processor
262 Invalidation processor
270 Parameter updating portion
300 Main interface
301 Chair button

The invention claimed is:

1. An information processing system including:
one or more processors programmed to
draw a display image for a terminal including at least a first display medium positioned in a virtual space;
acquire user input;
switch, between a plurality of states, a state of the first display medium associated with a user, the plurality of states including (i) a first state in which a position of the first display medium can be changed from a current position, and (ii) a second state in which the position of the first display medium cannot be changed from the current position;
change the position of the first display medium in the virtual space, based on a first input from the user when the state of the first display medium is the first state; and
switch a viewpoint from which the display image is drawn associated with the user from a first viewpoint to a second viewpoint when the state of the first display medium is switched from the first state to the second state.

2. The information processing system according to claim 1, wherein
the one or more processors draw the first display medium in a different mode depending on whether the first display medium is in the first state or the second state.

3. The information processing system according to claim 1, wherein
the one or more processors switch the state of the first display medium when a predetermined first switching condition is established.

4. The information processing system according to claim 1, wherein
when the first display medium is positioned in a specific area of the virtual space, in response to a second input from the user, the one or more processors switch the state of the first display medium.

5. The information processing system according to claim 4, wherein
the one or more processors draw a user interface for inputting the second input while the first display medium is in the first state.

6. The information processing system according to claim 5, wherein
the one or more processors invalidate the user interface or invalidate the second input via the user interface when a predetermined invalidation condition is established.

7. The information processing system according to claim 4, wherein
the specific area includes an arbitrary current position of the first display medium, which is in the first state.

8. The information processing system according to claim 1, wherein
the first display medium is drawn in a manner representing a seated state of being seated on a specific object in the virtual space when the first display medium is in the second state.

9. The information processing system according to claim 8, wherein
the specific object is in a form of a chair, and
the one or more processors newly draw the specific object associated with the first display medium when the state of the first display medium is switched from the first state to the second state.

10. The information processing system according to claim 1, wherein
the one or more processors output a character or voice that is perceivable by another user different from the user, based on a third input from the user associated with the first display medium in the second state, when the third input is acquired.

11. The information processing system according to claim 10, wherein
the first display medium is drawn in a manner representing a state of making a vocal sound when the character or the voice is output based on the third input from the user.

12. The information processing system according to claim 10, wherein
the one or more processors emphasize (i) the first display medium or (ii) a predetermined image associated with the first display medium as compared with (i) another display medium or (ii) a predetermined image associated with the other display medium, when the character or the voice is output based on the third input from the first user.

13. The information processing system according to claim 1, wherein
the first display medium is in a form including a specific part whose orientation can be changed, and
when a fourth input from the first user associated with the first display medium in the second state is acquired, the one or more processors change the orientation of the specific part in the first display medium, based on the fourth input.

14. The information processing system according to claim 13, wherein
the specific part includes a face, an upper body, or eyes.

15. The information processing system according to claim 13, wherein
the one or more processors change the viewpoint from which the display image is drawn associated with the user, based on the fourth input.

16. The information processing system according to claim 13, wherein
the fourth input and the first input are generated based on the same input by the user.

17. The information processing system according to claim 1, wherein
the first viewpoint includes a viewpoint in which the first display medium associated with the user is drawn, and
the second viewpoint includes a viewpoint viewed from the first display medium associated with the user.

18. The information processing system according to claim 1, wherein
the one or more processors switch the state of the first display medium from the second state to the first state when a predetermined second switching condition is established.

19. The information processing system according to claim 1, wherein
the one or more processors invalidate the first input from the first user when the state of the first display medium associated with the first user is the second state.

20. A non-transitory computer-readable medium storing an information processing program that causes a computer to execute a process of:
drawing a display image for a terminal including at least a first display medium positioned in a virtual space;
acquiring user input;
switching, between a plurality of states, a state of the first display medium associated with a user, the plurality of states including (i) a first state in which a position of the first display medium can be changed from a current position, and (ii) a second state in which the position of the first display medium cannot be changed from the current position;
changing the position of the first display medium in the virtual space, based on a first input from the user when the state of the first display medium is the first state; and
switching a viewpoint from which the display image is drawn associated with the user from a first viewpoint to a second viewpoint when the state of the first display medium is switched from the first state to the second state.

21. An information processing method executed by a computer, the method comprising:
drawing a display image for a terminal including at least a first display medium positioned in a virtual space;
acquiring user input;
switching, between a plurality of states, a state of the first display medium associated with a user, the plurality of states including (i) a first state in which a position of the first display medium can be changed from a current position, and (ii) a second state in which the position of the first display medium cannot be changed from the current position;
changing the position of the first display medium in the virtual space, based on a first input from the user when the state of the first display medium is the first state; and
switching a viewpoint from which the display image is drawn associated with the first user from a first viewpoint to a second viewpoint when the state of the first display medium is switched from the first state to the second state.

* * * * *